United States Patent
Selva et al.

(10) Patent No.: US 11,176,443 B1
(45) Date of Patent: Nov. 16, 2021

(54) APPLICATION CONTROL AND TEXT DETECTION FROM APPLICATION SCREEN IMAGES

(71) Applicant: Automation Anywhere, Inc., San Jose, CA (US)

(72) Inventors: Bruno Selva, Mountain View, CA (US); Abhijit Kakhandiki, San Jose, CA (US); Virinchipuram J Anand, San Ramon, CA (US); Nakuldev Patel, Vadodara (IN)

(73) Assignee: Automation Anywhere, Inc., San Jose, CA (US)

( * ) Notice: Subject to any disclaimer, the term of this patent is extended or adjusted under 35 U.S.C. 154(b) by 177 days.

(21) Appl. No.: 16/695,030

(22) Filed: Nov. 25, 2019

Related U.S. Application Data

(63) Continuation-in-part of application No. 16/527,048, filed on Jul. 31, 2019, and a continuation-in-part of
(Continued)

(51) Int. Cl.
*G06K 9/00* (2006.01)
*G06N 3/04* (2006.01)
(Continued)

(52) U.S. Cl.
CPC ....... *G06N 3/0454* (2013.01); *G06K 9/00442* (2013.01); *G06K 9/3241* (2013.01);
(Continued)

(58) Field of Classification Search
CPC ...... G06N 3/08; G06K 9/6288; G06K 9/6228; G06K 9/80; G06K 9/6232; G06K 9/46;
(Continued)

(56) References Cited

U.S. PATENT DOCUMENTS

| | | | | |
|---|---|---|---|---|
| 6,009,192 A | * | 12/1999 | Klassen | H04N 1/64 382/166 |
| 6,397,215 B1 | * | 5/2002 | Kreulen | G06F 16/35 715/259 |

(Continued)

OTHER PUBLICATIONS

Alex Krizhevsky, Ilya Sutskever, and Geoffrey E Hinton, Imagenet classification with deep convolutional neural networks. Advances in neural information processing systems (2012).
(Continued)

*Primary Examiner* — Ali Bayat

(57) ABSTRACT

Automation controls and associated text in images displayed by a computer application are automatically detected by way of region-based R-FCN and Faster R-CNN engines. Datasets comprising images containing application controls, where the application controls include images of application where width is greater than height, width is equal to height and height is greater than width are retrieved and each dataset is processed with the R-FCN and Faster R-CNN engines to generate a software robot configured to recognize corresponding application controls. Text is recognized by an optical character recognition system that employs a deep learning system trained to process a plurality of images to identify images representing text within each image and to convert the images representing text to textually encoded data. The deep learning system is trained with training data generated from a corpus of real-life text segments that are generated by a plurality of OCR modules.

20 Claims, 22 Drawing Sheets

Related U.S. Application Data application No. 15/851,617, filed on Dec. 21, 2017, now Pat. No. 10,489,682.

(51) Int. Cl.
    *G06N 3/08*     (2006.01)
    *G06K 9/62*     (2006.01)
    *G06K 9/46*     (2006.01)
    *G06K 9/32*     (2006.01)

(52) U.S. Cl.
CPC ............. *G06K 9/46* (2013.01); *G06K 9/6257* (2013.01); *G06K 9/6262* (2013.01); *G06K 9/6267* (2013.01); *G06K 9/6288* (2013.01); *G06N 3/08* (2013.01); *G06K 2209/01* (2013.01)

(58) Field of Classification Search
CPC ......... G06K 9/6267; G06F 16/53; G06T 7/60; G06T 2207/20084; G06T 2207/20081
USPC .......................................................... 382/160
See application file for complete search history.

(56) References Cited

U.S. PATENT DOCUMENTS

| | | | |
|---|---|---|---|
| 8,504,803 B2 | 8/2013 | Shukla | |
| 9,462,042 B2 | 10/2016 | Shukla et al. | |
| 9,984,683 B2* | 5/2018 | Li | G06N 3/0454 |
| 10,025,773 B2 | 7/2018 | Bordawekar et al. | |
| 10,078,743 B1 | 9/2018 | Baldi et al. | |
| 10,872,271 B2* | 12/2020 | Zagaynov | G06T 5/002 |
| 2005/0002566 A1 | 1/2005 | Federico et al. | |
| 2005/0144462 A1 | 6/2005 | LaGarde | |
| 2010/0013848 A1 | 1/2010 | Hekstra et al. | |
| 2012/0076415 A1 | 3/2012 | Kahn | |
| 2012/0154633 A1 | 6/2012 | Rodriguez | |
| 2016/0014043 A1* | 1/2016 | Kong | H04L 67/42 709/203 |
| 2016/0019049 A1 | 1/2016 | Kakhandiki et al. | |
| 2016/0078368 A1 | 3/2016 | Kakhandiki et al. | |
| 2016/0119285 A1 | 4/2016 | Kakhandiki et al. | |
| 2017/0060108 A1 | 3/2017 | Kakhandiki et al. | |
| 2017/0154230 A1* | 6/2017 | Dow | G06K 9/00879 |
| 2017/0213130 A1 | 7/2017 | Khatri et al. | |
| 2017/0330076 A1 | 11/2017 | Valpola | |
| 2018/0004823 A1 | 1/2018 | Kakhandiki et al. | |
| 2018/0137413 A1* | 5/2018 | Li | G06N 3/0481 |
| 2018/0157386 A1 | 6/2018 | Su | |
| 2018/0173698 A1 | 6/2018 | Dubey et al. | |
| 2019/0057315 A1* | 2/2019 | Yi | G06K 9/3258 |

OTHER PUBLICATIONS

Andrew G Howard, Menglong Zhu, Bo Chen, Dmitry Kalenichenko, Weijun Wang, Tobias Weyand, Marco Andreetto, and Hartwig Adam, Mobilenets: Efficient convolutional neural networks for mobile vision applications, arXiv:1704.04861v1 (2017).

Chollet, Francois et al., Keras: The Python Deep Learning Library, GitHub, https://github.com/keras-team/keras, 2015.

Christian Szegedy, Wei Liu, Yangqing Jia, Pierre Sermanet, Scott Reed, Dragomir Anguelov, Dumitru Erhan, Vincent Vanhoucke, and Andrew Rabinovich, Going deeper with convolutions, Proceedings of the IEEE conference on computer vision and pattern recognition, pp. 1-9 (2015).

J. Canny, A computational approach to edge detection, IEEE Transactions on Pattern Analysis and Machine Intelligence, PAMI-8(6):679-698, Nov. 1986.

Jifeng Dai, Yi Li, Kaiming He, and Jian Sun, R-fcn: Object detection via region-based fully convolutional networks, Advances in neural information processing systems, 2016.

Joseph Redmon, Santosh Divvala, Ross Girshick, and Ali Farhadi, You only look once: Unified, real-time object detection, Proceedings of the IEEE conference on computer vision and pattern recognition, pp. 779-788, 2016.

Kaiming He, Xiangyu Zhang, Shaoqing Ren, and Jian Sun, Deep residual learning for image recognition, Proceedings of the IEEE conference on computer vision and pattern recognition (2016).

Koen EA Van De Sande, Jasper RR Uijlings, Theo Gevers, and Arnold WM Smeulders, Segmentation as Selective search for Object Recognition, International journal of computer vision, 104(2) (2013).

M. A. Hearst, S. T. Dumais, E. Osuna, J. Platt, and B. Scholkopf, Support vector machines, IEEE Intelligent Systems and their Applications, 13(4):18-28, Jul. 1998.

Navneet Dalal and Bill Triggs, Histograms of oriented gradients for human detection, International Conference on computer vision & Pattern Recognition (CVPR'05), vol. 1, pp. 886-893. IEEE Computer Society, 2005.

Ross Girshick, Fast r-cnn, Proceedings of the IEEE international conference on computer vision (2015).

Ross Girshick, Jeff Donahue, Trevor Darrell, and Jitendra Malik, Rich feature hierarchies for accurate object detection and semantic segmentation, Proceedings of the IEEE conference on computer vision and pattern recognition (2014).

Shaoqing Ren, Kaiming He, Ross Girshick, and Jian Sun, Faster r-cnn: Towards real-time object detection with region proposal networks, Advances in neural information processing systems, 2015.

Tsung-Yi Lin, Michael Maire, Serge Belongie, James Hays, Pietro Perona, Deva Ramanan, Piotr Dollár, and C Lawrence Zitnick, Microsoft coco: Common objects in context, European conference on computer vision (2014).

Tsung-Yi Lin, Priya Goyal, Ross Girshick, Kaiming He, and Piotr Dollár, Focal loss for dense object detection, Proceedings of the IEEE international conference on computer vision (2017).

Wei Liu, Dragomir Anguelov, Dumitru Erhan, Christian Szegedy, Scott Reed, Cheng-Yang Fu, and Alexander C Berg, Ssd: Single shot multibox detector, European conference on computer vision, pp. 21-37. Springer, 2016.

\* cited by examiner

INVOICE — 201
#7836248 — 202

AUTOMATION ANYWHERE — 212

Automation Anywhere, Inc. — 203
633 River Oaks Pkwy
San Jose, CA 95134

Bill To:
Your Company, Inc. — 204
123 Fake St.
San Jose, CA 95134

205 —
Date: Dec 4, 2017
206 — Payment Terms: NET 30
207 — Due Date: Jan 1, 2018
208 — Balance Due: $66.40

| Item | Quantity | Rate | Amount |
|------|----------|------|--------|
| Widget | 3 | $1 | $3 |
| Gadget | 4 | $2 | $8 |
| Stuff | 100 | $0.50 | $50 |
|  |  | Subtotal: | $61 |
|  |  | Tax (9%): | $5.49 |
|  |  | Total: | $66.49 |

APPLICATION CONTROL AND TEXT DETECTION FROM APPLICATION SCREEN IMAGES

RELATED APPLICATIONS

This application is a continuation-in-part of and claims the priority benefit under 35 U.S.C. § 120 of the following pending U.S. patent applications, the entire disclosures of which are hereby incorporated by reference herein: U.S. patent application Ser. No. 15/851,617, filed on Dec. 21, 2017, entitled "OPTICAL CHARACTER RECOGNITION EMPLOYING DEEP LEARNING WITH MACHINE GENERATED TRAINING DATA", and U.S. patent application Ser. No. 16/527,048, filed on Jul. 31, 2019, entitled "AUTOMATED DETECTION OF CONTROLS IN COMPUTER APPLICATIONS WITH REGION BASED DETECTORS."

FIELD OF THE DISCLOSURE

This disclosure relates generally to the field of data processing systems and more particularly to computerized recognition of digitized images.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

Accurate identification and extraction of data from business documents is an important aspect of computerized processing of business documents. In particular, as the demand for automation increases, it is imperative to recognize text and visual controls in legacy application programs, which do not provide programmatic access, in order to automate usage of such applications. For websites, the code is available in one form or another so detection of controls and their type on the website is relatively straightforward. However, many licensed applications do not allow permit access to their code. Automated detection of controls and recognition of text in the visual interface of such applications for automation is a challenge. Detection of such controls could reduce monotonous tasks such as data entry and form filling, thereby potentially saving thousands of man-hours and leading to better accuracy.

Detection of text in applications for which the only the visual form of the text is available, as opposed to the underlying encoded form which allows programmatic access similarly can pose a challenge to RPA. Typically, such text is recognized via Optical Character Recognition (OCR) which involves conversion of data encoded in image form into machine-encoded text. A common example is conversion from a known image format, such as PDF, TIFF or JPEG, among others, into a text encoded format. OCR operates to provide a form of information entry to allow printed paper data records to be converted to a format that can be electronically edited, searched, stored more compactly, displayed on-line, and used in various machine processes. Accuracy of OCR has become more important as computerization of business processes has increased. Unfortunately, known OCR programs do not provide the accuracy required for automated and systematic usage in business processes. There is accordingly a need for an improved OCR system that provides a level of accuracy required for demanding applications such as business processes.

SUMMARY

The embodiments disclosed herein simplify and improve RPA in virtual environments where only screen images are available to a software robot. By employing artificial Intelligence (AI), machine learning (ML), natural language processing (NLP), and computer vision (CV), the disclosed embodiments improve automation in such environments, where standard object-based automation is not available or unreliable. Changes in resolution and scale between host and client machines, and changes in position of UI elements on the screen for web applications do not affect automation accuracy in such embodiments. Dynamic objects are supported, and resilient automation is created independent of resolution, scale, and position of UI elements.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 shows an image of an invoice that may be processed by the deep-learning based OCR system.

FIG. 5 illustrates the document image of FIG. 2 after segmentation.

DETAILED DESCRIPTION

Figure 1:
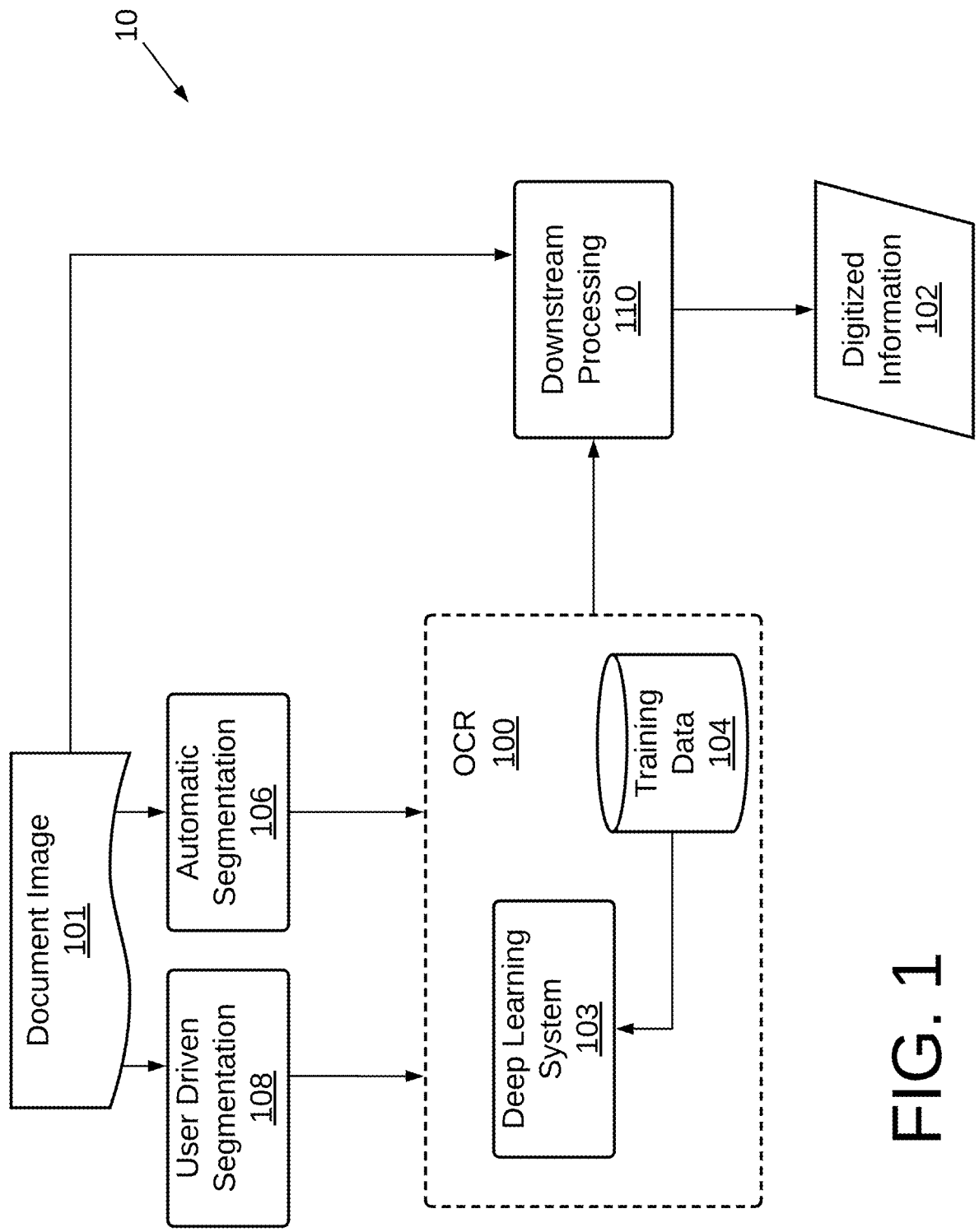
FIG. 1 is high-level block diagram of an embodiment of a document digitization system employing deep-learning based OCR within a system 10.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Today, enterprises large and small employ a variety of virtual environments, such as provided for example by Citrix, to host applications of all types. These environments help organizations keep infrastructure costs down and data secure behind a firewall. This security however removes programmatic access to the visual interfaces provided by hosted applications. This is particularly acute in RPA.

In a typical virtual hosted application environment, a server (such as provided by Citrix) sends an image of the application to a client. In an RPA environment, the automation platform does not have access to the UI elements displayed to the user to enable accurate automation. For example, changes in resolution and scale between host and client machines affect automation accuracy. Also, changes in position of UI elements on the screen for web applications affect automation accuracy.

The disclosed embodiments provide a solution by way of dynamic objects and creation of resilient automation independent of resolution, scale, and position of UI elements by employing artificial Intelligence (AI), machine learning (ML), natural language processing (NLP), and computer vision (CV), Use of such advanced capabilities and learning algorithms make automation in all environments faster and more accurate compared to existing solutions. The disclosed embodiments are particularly beneficial in environments where standard object-based automation is not available or unreliable, such as applications exposed over Citrix, applications accessed over remote desktop, or legacy applications (such as offered by Delphi, QT, or Flex).

Typically, an enterprise will employ a virtual environment to enhance security and improve regulatory compliance regarding data security, financial and privacy regulations. One important benefit that drives the use of virtual environments is that they keep data secure behind the firewall of an organization. A virtual environment operates to remotely render only a user interface of an application, thereby providing no access to the underlying application, data, or user-interface objects. By rendering the display only, the transactional data remains behind the firewall and within the data center boundaries. This enforces complete isolation of business data from the user's operating system and other applications installed on it, thus ensuring business applications and data are secure from any threats or attacks.

An enterprise will also employ a virtual environment to lower cost. Host applications can be run on a few servers running the native devices as instances rather than on hundreds of laptops or desktops. Any change in configuration or application update needs to be done only on these few servers where the native devices reside. This also helps organization's implement strategies like bring your own device (BYOD) on the remote device, subsequently helping them save substantially in management, device and licensing costs.

Other reasons for an enterprise to employ a virtual environment include high availability and flexibility. High availability provides improved failover to provide better 24×7 application availability. Flexibility allows users to access the provisioned application executing on the native device from anywhere with any remote device like a smartphone or laptop. Finally, virtual environments simplify maintenance by permitting data backup and restoration to be easily done within a data center where the applications are hosted.

The disclosed embodiments employ embedded AI, machine learning (ML), natural language processing (NLP) and computer vision (CV) to develop learning algorithms to simplify automation for hosted applications. Such techniques become more accurate as they learns from the user.

The computer vision employed in the disclosed embodiments intelligently creates dynamic linking between objects by determining their composition. This intelligent linking delivers change-resilient automation. The disclosed embodiments accurately automate applications even where labels and text change their relative position. The disclosed embodiments are particularly useful in cases where standard object-based automation is not available or unreliable, for example, in applications exposed over Citrix, applications accessed over remote desktop, or legacy applications such as provided by Delphi, QT, or Flex.

The disclosed embodiments support dynamic objects by employing advanced computer vision to understand the composition of a page. This automation is resilient to changes in the location of UI objects, changes in format and color of the objects, and changes in the structure of the objects. The disclosed embodiments also provide resolution-independent image recognition which can accurately locate application images even when the machine resolution, scale or zoom level has changed. This ensures automation accuracy in cases where development and production machines have different configurations.

The disclosed embodiments also provide an auto mode to search UI elements. An AI-powered smart screen automation automatically switches between OCR mode and image mode to increase accuracy of the software robot. The disclosed embodiments also support image and text occurrence. If the system searches for a particular UI element through image or text identification (OCR) and the given image/text is present more than once on the screen, the disclosed smart screen automation enables the user to pick the desired image or text. This is important because many OCR methods pick the first occurrence of the image, which may not be accurate.

The disclosed embodiments also provide a data burst mode which inputs data from all UI elements after just a single scan of the application screen or image. This can save many hours of execution time compared to other techniques that require multiple scans of the same screen before each data input. The disclosed embodiments also provide for bulk data extraction which extracts data from all UI elements after just a single scan of the application screen or image. Like data burst, this can save many hours of execution time compared to other techniques that require multiple scans of the same screen before each data extraction.

Text Detection

Survey and testing of a number of commercially available, state-of-the-art OCR systems, both commercial and open-source ones, has revealed a level of accuracy that falls short of human-level accuracy—which is presumed to be at 98% or higher character-level accuracy, as surmised for a domain of documents, such as for example, invoices. Most mature and commercial OCR products are built using traditional algorithms, which do not perform well if the document image contains fancy fonts, patterned noise (for example, in table headers of invoices), or image distortions due to the scanning process. On the other hand, open-source OCRs built using modern deep-learning methods fall short on accuracy since they are trained on more disparate, wider, and different statistics of text images as compared to a particular domain of interest.

The systems and methods disclosed herein employ a trained deep-neural net that rivals human accuracy for OCR of documents within a domain of interest. Table 1 below shows accuracy results on a test set comprising black-and-white segments from English language invoices. Segment-level accuracy represents accuracy of a whole word (1.0 if correct, otherwise 0).

TABLE 1

OCR accuracy comparison on black-and-white English language invoices

| | Segment-Level Accuracy | Character-Level Accuracy |
|---|---|---|
| Embodiment 1 (no Human Labeling) | 0.82 | 0.95 |
| OCR1 (neural model) | 0.66 | 0.84 |
| OCR2 (traditional) | 0.63 | 0.81 |
| OCR3 (traditional) | 0.56 | 0.72 |
| OCR4 (traditional) | 0.45 | 0.65 |

Human accuracy is generally around 98%, with mistakes arising largely from boredom or if text is unreadable. Accuracy may also be affected by transcription errors, for example the text may be correctly recognized but entered incorrectly. As seen in Table 1, four commercially available OCR programs (OCR1, OCR2, OCR3, OCR4) produce character-level accuracy ranging from 0.65 to 0.84 (65%-84%). An embodiment employing the principles described herein produced character-level accuracy of 95%, without the benefit of mistakes in training data fixed via human labeling, which is close to human-level accuracy.

Deep neural nets require large data sets for adequate training. In the case of OCR, the data takes the form of tuples, image/text pairs. Conventionally, such data can be generated by humans who perform manual labeling. To increase accuracy, the same data may be labeled by multiple individuals and then compared to identify mistakes. While this technique can yield a high-quality data set for training, it can be quite time consuming and expensive when considering that a data set to adequately train a deep neural net can comprise millions or tens of millions of tuples. Advantageously, the disclosed systems employ a novel combination of conventional, relatively low-accuracy OCR systems to generate training data rapidly and without requiring time-consuming and expensive human labeling.

FIG. 1 is high-level block diagram of an embodiment of a document digitization system employing deep-learning based OCR within a system 10. The computer system 10 operates to convert a document image 101 into digitized, textually encoded information 102. The document image 101 may be a conventionally encoded image file such as a PDF, TIFF, or JPEG file. The computer system 10 employs an OCR system 100 including deep learning system 103 which employs a conventional class of machine learning algorithms to perform OCR. As will be appreciated by those skilled in the art, such algorithms are characterized by a cascade of multiple layers of nonlinear processing units for feature extraction and transformation. Each successive layer uses the output from the previous layer as input. Such algorithms may learn in supervised and/or unsupervised manners and may learn multiple levels of representations that correspond to different levels of abstraction. Moreover, a form of gradient descent for training via backpropagation may be employed. Deep learning system 103 operates with training data 104, stored in conventional data storage, that is generated to train deep learning system 103 designed to perform at high accuracy for a particular domain. For example, if the domain of interest is English language invoices, then the training data 104 will comprise image/text pairs generated from a large number (e.g. a few hundreds of thousands) of invoices.

The system 10 employs automatic segmentation module 106 that operates conventionally to break up a document image into sub-images of characters, words, or even group of contiguous words in a line. In contrast to conventional OCRs, that decode one character at a time, the OCRs based on a neural network (such as the one described herein) can decode groups of words in one shot. Isolating a sub-image of one character from a black-and-white document image is usually performed by identifying streaks of black pixels. These character segmentations are then combined horizontally allowing for inter-letter white space to form word segmentation, and further combined horizontally allowing for inter-word white space. These sub-images of groups of words are processed one by one by the OCR system 100 to produce the digitized text. The system 10 may also permit user driven segmentation 108.

The decoded text generated by OCR system 100 is preferably further processed at downstream processing module 110 to extract semantically related text elements. For example, decoded text across multiple lines could be grouped together to form "Shipping Address" on an invoice.

The downstream processing 110 may additionally require the original document image 101 to make this determination. The downstream processing 110 may also include techniques to increase accuracy by imposing constraints provided by a lexicon, a list of words that are allowed to occur in a document. This might be, for example, all the words in the English language, or a more technical lexicon for a specific field, such as invoices. In certain embodiments, other techniques such as "near-neighbor analysis" which makes use of co-occurrence frequencies to correct errors may also be employed. The digitized information 102 may be a plain text stream or a file of characters or a spreadsheet organizing the information of interest and arranged according to semantics. In certain embodiments, the original layout of the document image 101 may be preserved and annotated with a searchable textual representation.

FIG. 2 shows an image of an invoice that may be processed by the deep-learning based OCR system 100. As seen, the invoice 200 has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein.

OCR processing of invoice 200 poses challenges over and above those posed by text formatted in paragraph form. The location of the fields explained above for invoice 200 can vary dramatically. The content of the fields may also vary. For example, some invoices may not contain an itemization as shown at 209. Some invoices may also only provide payment terms such as 206 and will not provide a due date 207. Other invoices may include fields not shown in invoice 200, such as pending amounts that are unpaid. Moreover, aesthetic elements can vary widely. The fonts can vary, with different colors, sizes and font types being used. Ornamental images may also be used in the background or foreground of the invoice. A background image may take the form of a watermark. A foreground image may take the form of a corporate logo such as seen at 212.

Figure 3:
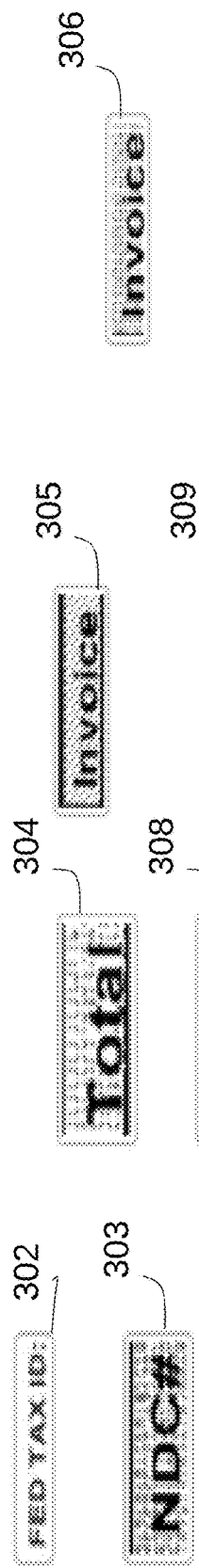
FIG. 3 shows examples of text segments that challenge conventional, low accuracy OCR systems.

Some elements of invoices can pose particular challenges to OCR conversion. Examples of these are shown in FIG. 3. The input to an OCR system is a black-and-white image in digital format. Independent of file format the digital representation of an image is a grid of pixels, each of which has a number of bits to designate the color at that grid position. For black-and-white images the color could either be black (e.g., (0,0,0) in 24-bit RGB format) or white (e.g., (255,255, 255) in 24-bit RGB format). The challenge in OCR is to decode the text character(s) corresponding to a grid of pixel values. For example, although the desired decoded text for both 305 and 306 is the word "Invoice" the grid of pixel values corresponding to the two cases are vastly different. Such diversity in input may be caused due to reasons such as varied fonts and sizes (e.g., 302 and 307 have very different fonts), presence of patterned noise (e.g., 303, 304, 305, 306), presence of spurious lines due to segmentation artifacts (e.g., 303, 304, 305), scanning artifacts such as excessive fading (e.g., 308 is a faded image), blurring as seen at 309, or excessive blackening. These variations can typically cause challenges to OCR conversion, for example, in testing, the OCR system OCR1 produces incorrect results for the 8 examples shown in FIG. 3.

It should be noted that while the present disclosure shows invoices as an example of a particular domain in which the principles of the invention may be employed, the principles described herein may be employed equally well in other domains, and in particular in other types of business documents, e.g., passports, property deeds, utility bills, eviction notices, and bank account statements.

Figure 4A:
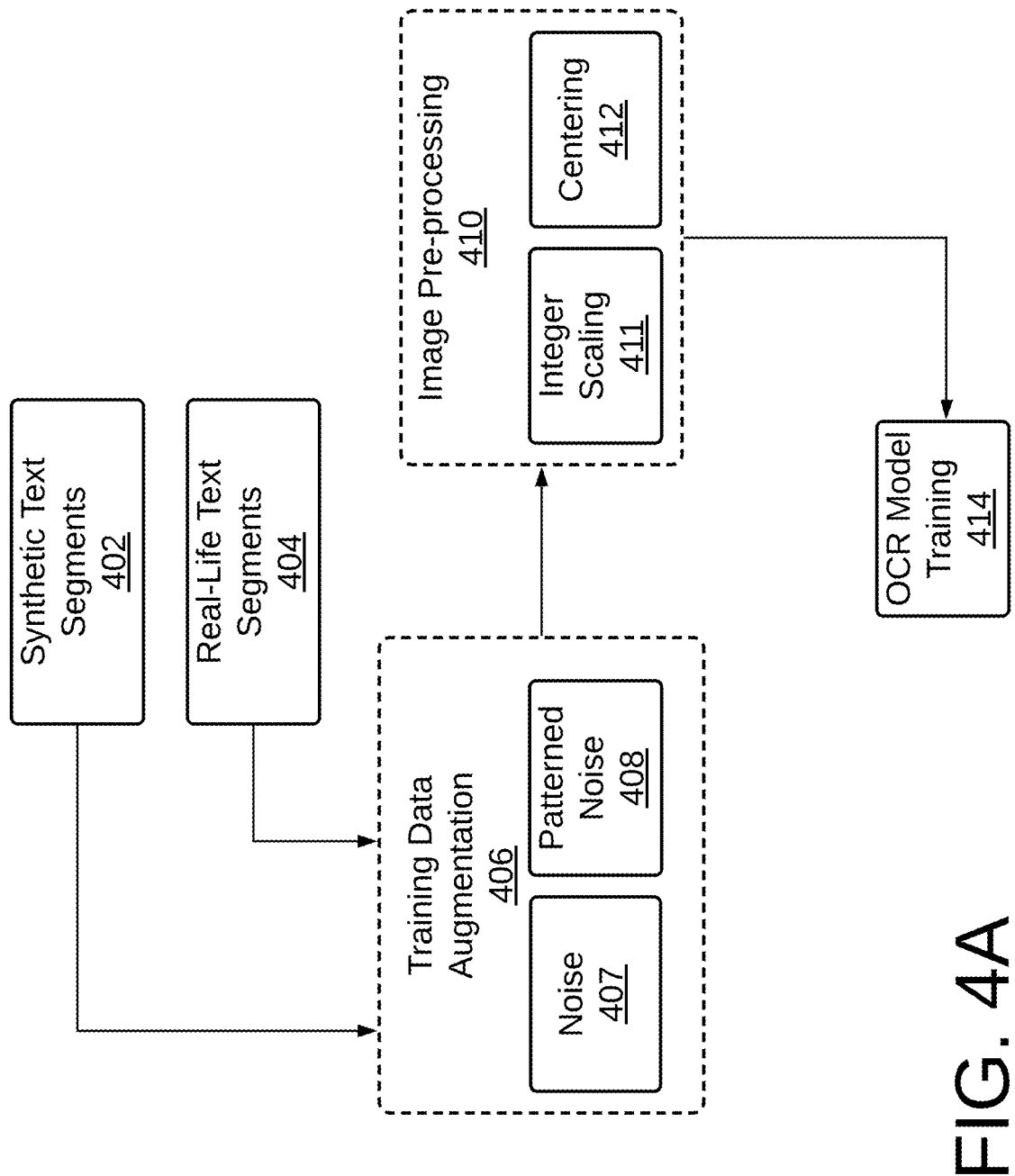
FIG. 4A is a block diagram illustrating generation of real-life text segments and synthetic text segments in generating the training data 104 of FIG. 1.

FIG. 4A is a block diagram illustrating generation of the real-life text segments and synthetic text segments in training the deep learning system shown in FIG. 1. A deep neural net such as employed by deep learning system 103 requires a large volume of training data 104 to operate effectively. In the OCR realm, such data takes the form of tuples (image, text). The disclosed systems employ a combination of synthetic text segments and real-life text segments as part of training data 104. Synthetic text segments 402 are image segments generated programmatically by rendering an "image" for a chosen "text" string as described in further detail in connection with FIG. 4C. Real-life text segments 404 are sub-images extracted out of documents, and they most accurately represent the statistics of the domain for which the OCR system is built, for example, English language Invoices. The "image" is extracted out of real documents, but the corresponding "text" is generated using weak and low-accuracy OCR systems with potential errors, as described in further detail in connection with FIG. 4B.

The synthetic text segments 402 and real-life text segments 404 are processed by training data augmentation module 406 and followed by image pre-processing module 410 to be used for OCR model training at 414. Image noise is superimposed at 407 onto randomly selected text images in the synthetic and real-life text segments 402 and 404. Preferably different types of image noise may be superimposed: (a) random speckled noise, (b) random lines, (c) random binarization threshold, (d) white on black text. Adding image noise is only performed during training and not post-training (inference).

In processing invoices, it was observed that table headers in invoices were the hardest for the OCR to extract text from. The table headers contained a wide variety of patterned-noise schemes, created by the aesthetic designers of the invoices. Fifty to sixty of the most common patterns were chosen and software code was developed to programmatically generate the chosen most common patterns. Preferably, at 408, for randomly selected text images in training data, different types of patterned noise are superimposed. Adding patterned noise is only performed during training and not post-training (inference).

In image pre-processing 410, the image portion of the text segments 402 and 404 are scaled and centered 412. Conventional deep learning algorithms have a fixed input dimension, for example, a 512×64 field-of-view. On the other hand, segment images in the text segments 402, 404 can have a wide range of dimensions. Rather than requiring the deep learning system 103 to learn a wide range of sizes (i.e., train the neural net for "size invariance"), embodiments scale the input images to the largest size that fits in the field of view of the selected deep learning algorithm. For example, if a segment is 76×21 it is upscaled at 411 by a factor of 3 (using a conventional pixel replication algorithm in one embodiment) to produce a larger segment of size 228×63. Furthermore, rather than pasting the 228×63 segment arbitrarily anywhere within the 512×64 field-of-view (i.e., train the neural net for "translation invariance") it is centered at 412, by for example, pasting the 228×63 segment at the center of 512×64 palette, pre-initialized with white pixels. The pre-processing performed by modules 406 and 410, operate to restrict an arbitrary segment to format into a fixed normative input for the deep learning system 103, thereby avoiding the need for the system 103 to learn "size invariance" or "translation invariance". This is in contrary to current approaches in training deep nets for computer vision problems and helps in improving accuracy of the model employed by system 100.

Deep learning system 103 preferably comprises several convolution layers with recurrent layers stacked on top. The convolution layers extract low-level features from the input image, whereas recurrent layers extract rules of how to stitch a sequence of image features to derive a sequence of text characters. Recurrent layers are most effectively trained in phases (called curriculums) with progressively increasing difficulty-level of training data used in each phase. This is called curriculum learning, and the curricula are preferably based on ramping length of text and noise levels. In certain embodiments, the Keras framework, available at https://github.com/mbhenry (Author: Mike Henry) may be used.

Figure 4B:
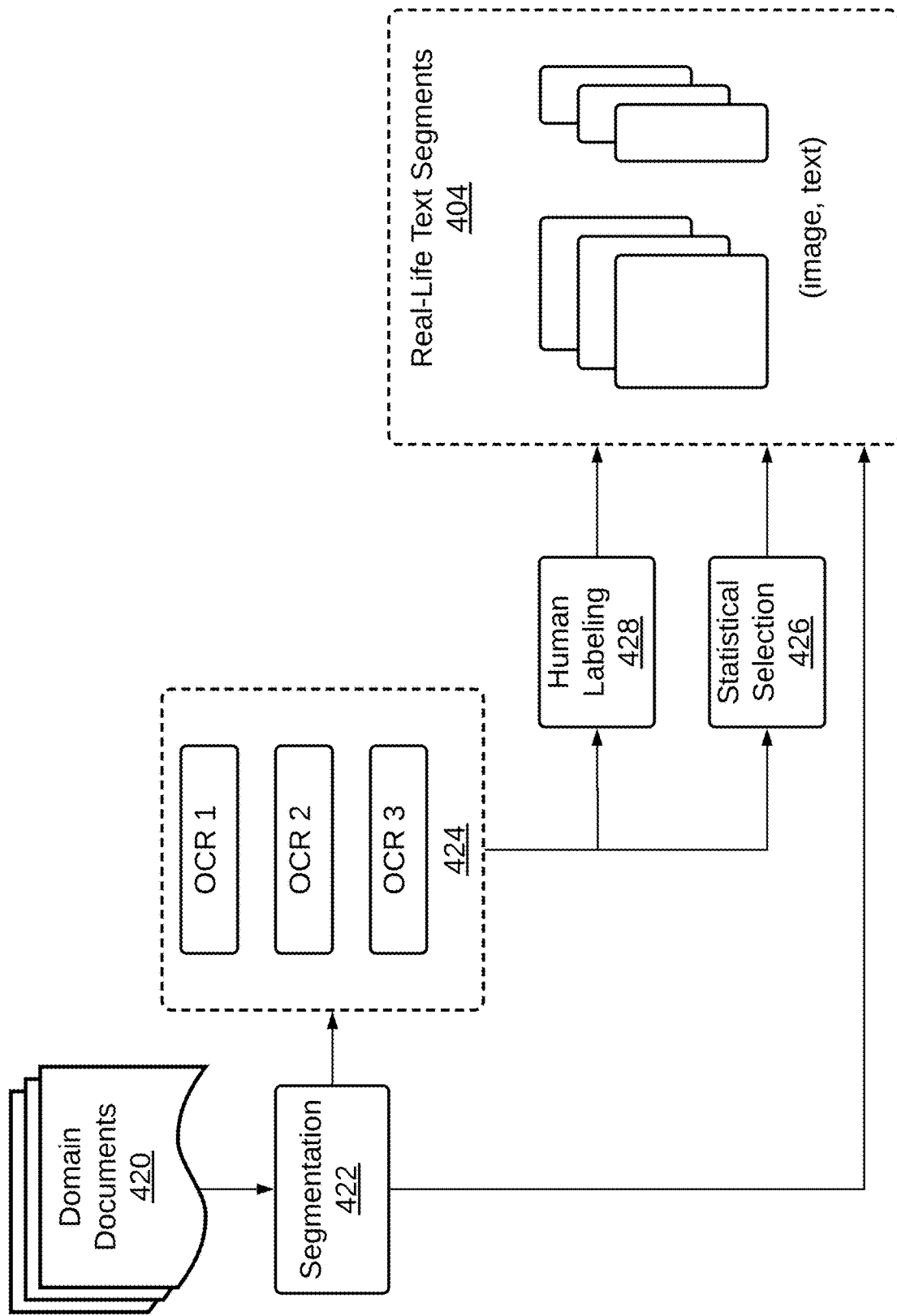
FIG. 4B is a block diagram illustrating generation of real-life text segments.

FIG. 4B is a block diagram illustrating generation of real-life text segments 404. A set of actual documents 420 within a particular domain, in this case, invoices, is accessed, segments are extracted 422, conventional OCR programs 424 that generate relatively low levels of accuracy, as seen in Table 1, are employed to process the segments which may then be labeled 426 and further processed at 428 to generate real-life text segments 402.

Figure 5:
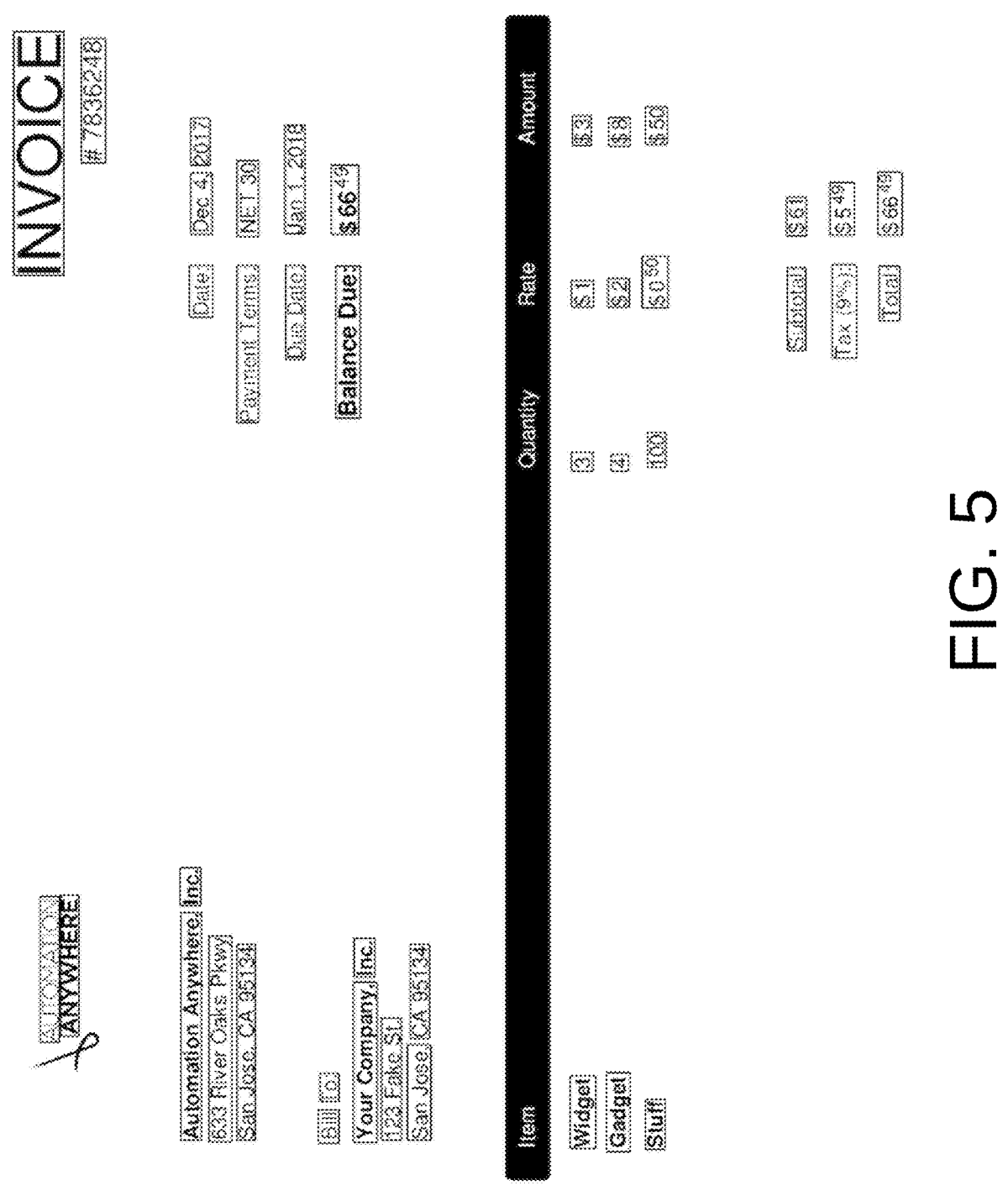

Segmentation at 422 is a common step in document digitization. It decomposes a document image into a large number of disjoint sub-images, such as the text delineated by rectangles as shown in FIG. 5, such that each sub-image contains at most a few words worth of text in a single line. Segmentation algorithms usually employ a programmable threshold on size or aspect ratio of the individual sub-images. Common algorithms for this problem are based on connected-components on pixel maps.

The OCR modules 424 may take the form of conventional OCR programs. Typically, such programs provide accuracy that is substantially below a level of accuracy desired for use in business applications, such as invoice processing where accuracy of the data extracted from an invoice is important. The OCR programs 424 advantageously generate large amounts of training data for the deep-learning model. Typically, the OCR programs 424 not only extract text from segment images, but also provide a confidence metric, either per character or per word or per segment. For probabilistic methods such as OCR programs based on neural nets the confidence metric represents the probability of correctness of its output results. This information is used by statistical selection module 426.

The "text" output from weak OCR programs 424 typically contains errors. For example, as seen in Table 1, the conventional OCR programs OCR 1-4 provide segment level accuracy ranging from 0.66 to 0.45. Statistical selection module 426 uses statistical metrics to select the highest quality (image, text) tuples generated by OCR modules 424 to generate the training data 104. Preferably the module 426 employs the following principles: (i) a confidence metric from a deep learning OCR program is more trustworthy than its traditional OCR program counterparts, (ii) segments are chosen in the order of OCR confidence e.g., prefer to choose a segment with higher confidence rather than lower confidence, (iii) selection of segments for which 'text' output has consensus among OCR programs is preferred over ones that do not have consensus, (iv) where there is no consensus, the order of selection is based on "edit distance" between 'text' outputs from different OCR programs e.g., prefer to choose a segment for which two OCR programs have text outputs with 1 character difference rather than segment for which two OCR programs have text outputs with 2 characters different, (v) a disjoint subset of segments is withheld for human labeling at 428, spanning all values of confidence metric, different consensus levels, etc., with the remaining segments serve as starting point for statistical selection. In the foregoing criteria, the "edit distance" refers to the number of changes required to change an incorrect string into a correct string. For example, the incorrect string "invoice" has an edit distance of 1 from the correct string "invoice". When generating the disjoint subset of segments to withhold for human labeling, the goal is to select segments that are relatively more difficult to process (e.g., segments for which OCR confidence was low) to provide the greatest diversity of data for training.

A small fraction of the segments extracted from the documents is sent through human labeling 428. This is the process of human workers providing the correct "text" annotation for a given "image". Preferably, a human worker is provided both the "image" and the best guess on the "text" which is produced by the strongest of the weak OCR programs. The human worker is therefore required to only make corrections to the "text" (produced by the strongest of the weak OCR programs), rather than typing every character. This helps in simplifying the human labeling task. It enhances productivity, makes the process less prone to human error, and thereby helps in saving cost of human labeling. The real-life text segments 404 consist of real-life image/text tuples which are each a pair of an image segment (as received from segmentation module 422) and its corresponding translated textually encoded representation.

Figure 4C:
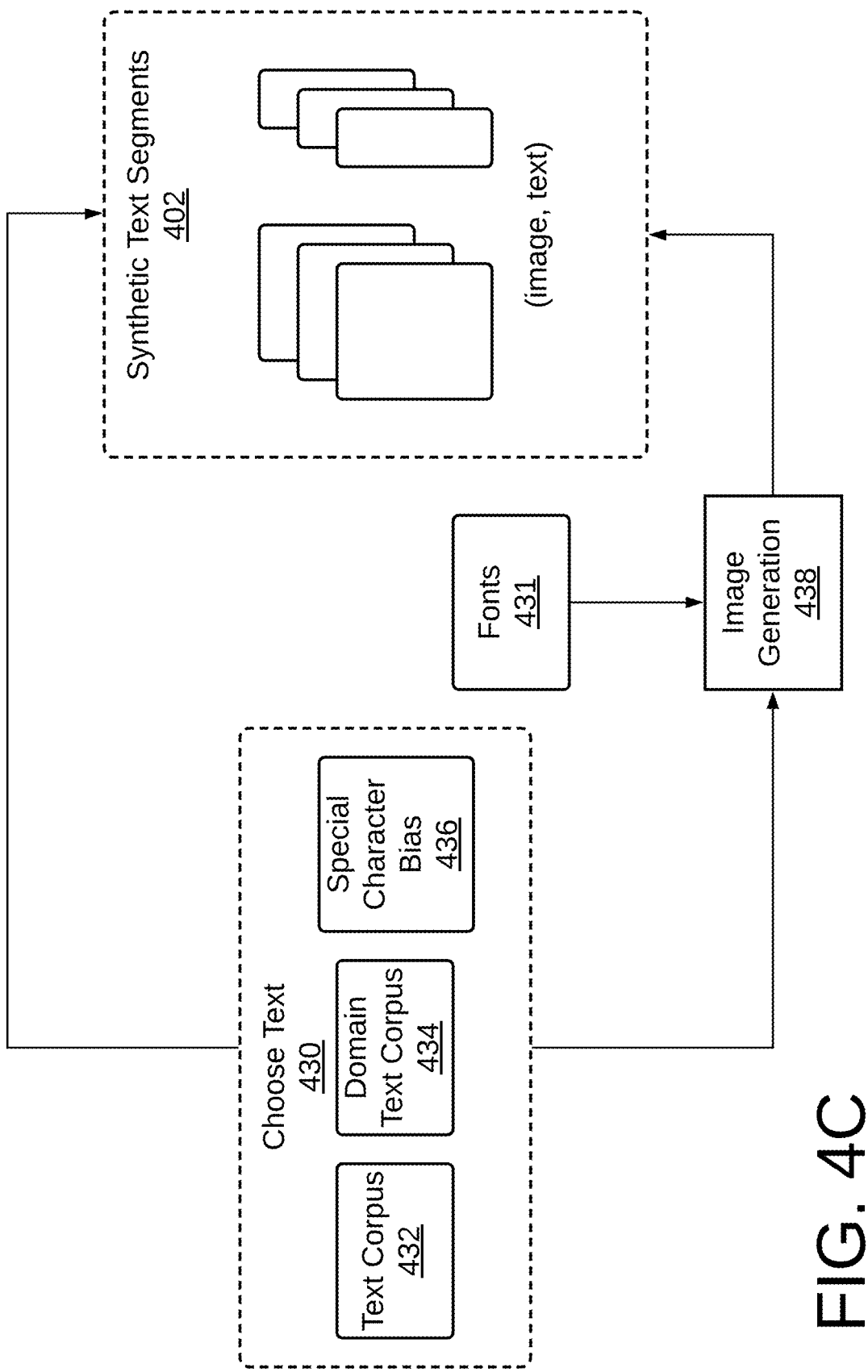
FIG. 4C is a block diagram illustrating generation of synthetic text segments.

FIG. 4C is a block diagram illustrating generation of synthetic text segments 402. Unlike real-life text segments here we choose an appropriate "text" first using statistics of the domain (in Text Corpus 432, Domain Text Corpus 434, and Special Character Bias 436) we are developing the OCR program for, followed by rendering the "text" into an "image" (in 438) using a random font and font-size from 431. This advantageously creates more training data for the deep learning system 103 in a cost-effective and rapid manner. The statistics represented in chosen "text" match characteristics of the domain of interest, such as language, special characters, and particular word segments. Furthermore, the image representation of synthetically generated text segments 402 contain the type of variety that may be encountered among different documents within the domain of interest so the images are more realistic. Using 432/434/436 we generate "text". We use this "text" and a randomly chosen font 431 to pass through image generation 438 and generate the "image".

For example, a variety of fonts may be employed. An existing repository such as the Google open-source repository for fonts available at https://github.com/google/roboto, that contains 2000+ fonts in up to 18 different styles each may be employed. Care must be taken (a) to filter out fonts & font-size combinations that render poor images, (b) to drop font families irrelevant to the domain e.g., exclude Greek characters when training a model for English language, (c) to properly handle unicase fonts e.g., in which "a" and "A" are represented by same shape Text corpus 432, in one embodiment, comprises several tens of thousands of fully-formed English sentences, composed of 2.4 million English words. This is advantageously large enough to capture the statistics of commonly used words and/or word combinations. In one embodiment, the 2.4 million English words is arranged in an ordered list so that word combinations and orderings are preserved. A sequence of text words for training data is first formed by choosing consecutive words from the ordered list and anchored at a random list-index. The segment length chosen randomly as a number between 1 through 8. Once the sequence of text words is determined it is then rendered into an image using a randomly chosen font and font size. This allows creation of (image, text) pairs randomly for training data.

Domain text corpus 434 provides statistics of common text elements in the domain of interest, here English language invoices, for example, frequent occurrence of numbers, dates, and addresses. In order to create Domain text corpus 434 we employ a conventional OCR program to extract text words from several thousand document examples. Even though the conventional OCR programs may have text extraction errors, they work sufficiently well for creating (image, text) tuples for training data. Note that unlike real-life text segments the OCR extraction errors pose less problems. In case of real-life segment the text extraction errors result in (image, text) tuples becoming inconsistent, while in case of synthetic segments the (image, text) tuples remain consistent, although not ideal for the purpose of training data. The Domain text corpus 434 is used just like Text corpus 432. First a sequence of words is randomly chosen to form "text" (using the method described for Text corpus 432) and then the corresponding "image" is rendered at 431 using a randomly chosen font and font size. Special character bias 436 operates to address the fact that English language invoices contain a larger proportion of text in capital letters. Furthermore, it operates to artificially inject a large proportion of special characters (".", ";", "/", "-", etc), that occur frequently in invoices. In one embodiment, such biases are injected into the randomly chosen sequence of words (either for Text corpus 432 or for Domain text corpus 434) and before the image is rendered.

Image generation module 438 operates to generate an image representation. The original text segments 429 are paired with the image representations generated at 438 to form synthetic (image,text) tuples 402, which each comprise a pair of an image segment together with its corresponding textually encoded representation.

Figure 6:
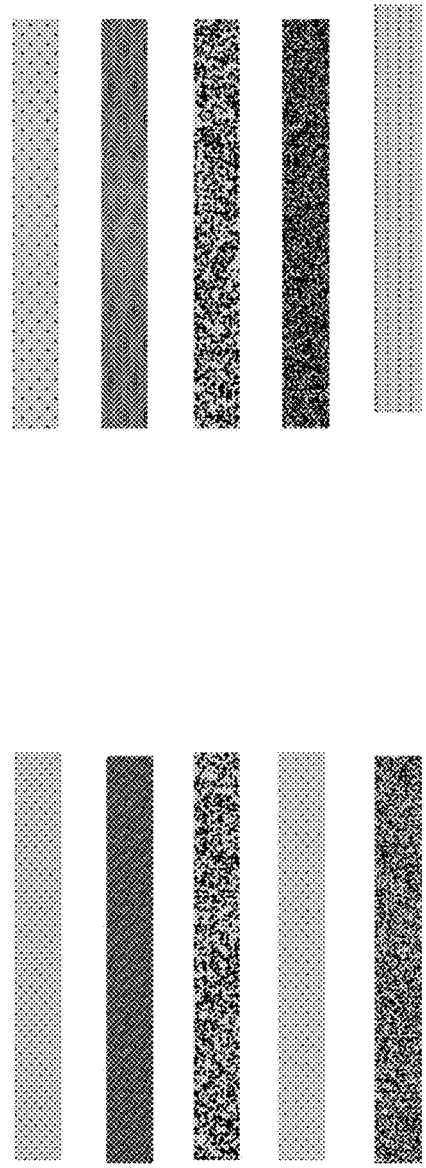
FIG. 6 shows examples of patterned noise found in invoices.

FIG. 6 shows examples of patterned noise that may be introduced by module 408. The ten examples shown in FIG. 6 are 512×64 pixel patterned noise templates that have been generated programmatically to represent patterns commonly found in English language invoices.

Object Detection

Explained below in connection with the disclosed embodiments is an overview of various approaches that have been employed in object detection. Preferred embodiments for detecting controls on a computer screen using state-of-the-art object detection models are then described. The disclosed object detection-based approach is also able to detect controls without definite boundaries like trees, which was not possible using any of the previous approaches.

Many attempts have been made previously to solve the problem of object detection, where the objects are computer controls on a computer screen, using computer vision and general edge detection techniques. However, these techniques are not generalized and heavily rely on the completeness of edges. Hence, controls with broken edges cannot be detected by such prior approaches. Moreover, visually appealing controls on modern webpages such as a textbox with just an underline are not detected by such conventional techniques.

In the following description, to improve readability, reference is made to the following publications by the accompanying reference numbers below:

[1] Wei Liu, Dragomir Anguelov, Dumitru Erhan, Christian Szegedy, Scott Reed, Cheng-Yang Fu, and Alexander C Berg, *Ssd: Single shot multibox detector*, European conference on computer vision, pages 21-37. Springer, 2016.

[2] Shaoqing Ren, Kaiming He, Ross Girshick, and Jian Sun, *Faster r-cnn: Towards real-time object detection with region proposal networks*, Advances in neural information processing systems, pages 91-99, 2015.

[3] Jifeng Dai, Yi Li, Kaiming He, and Jian Sun, *R-fcn: Object detection via region-based fully convolutional networks*, Advances in neural information processing systems, pages 379-387, 2016.

[4] Navneet Dalal and Bill Triggs, *Histograms of oriented gradients for human detection*, International Conference on computer vision & Pattern Recognition (CVPR'05), volume 1, pages 886-893. IEEE Computer Society, 2005.

[5] M. A. Hearst, S. T. Dumais, E. Osuna, J. Platt, and B. Scholkopf, *Support vector machines*, IEEE Intelligent Systems and their Applications, 13(4):18-28, July 1998.

[6] J. Canny, *A computational approach to edge detection*, IEEE Transactions on Pattern Analysis and Machine Intelligence, PAMI-8(6):679-698, November 1986.

[7] Alex Krizhevsky, Ilya Sutskever, and Geoffrey E Hinton, *Imagenet classification with deep convolutional neural networks*, Advances in neural information processing systems, pages 1097-1105, 2012.

[8] Ross Girshick, Jeff Donahue, Trevor Darrell, and Jitendra Malik, *Rich feature hierarchies for accurate object detection and semantic segmentation*, Proceedings of the IEEE conference on computer vision and pattern recognition, pages 580-587, 2014.

[9] Jasper R R Uijlings, Koen E A Van De Sande, Theo Gevers, and Arnold W M Smeulders, *Selective search for object recognition*, International journal of computer vision, 104(2):154-171, 2013.

[10] Joseph Redmon, Santosh Divvala, Ross Girshick, and Ali Farhadi, You only look once: Unified, real-time object detection, Proceedings of the IEEE conference on computer vision and pattern recognition, pages 779-788, 2016.

[11] Ross Girshick, Fast r-cnn, Proceedings of the IEEE international conference on computer vision, pages 1440-1448, 2015.

[12] Kaiming He, Xiangyu Zhang, Shaoqing Ren, and Jian Sun, *Deep residual learning for image recognition*, Proceedings of the IEEE conference on computer vision and pattern recognition, pages 770-778, 2016.

[13] Christian Szegedy, Wei Liu, Yangqing Jia, Pierre Sermanet, Scott Reed, Dragomir Anguelov, Dumitru Erhan, Vincent Vanhoucke, and Andrew Rabinovich, *Going*

*deeper with convolutions*, Proceedings of the IEEE conference on computer vision and pattern recognition, pages 1-9, 2015.
[14] Tsung-Yi Lin, Michael Maire, Serge Belongie, James Hays, Pietro Perona, Deva Ramanan, Piotr Dollár, and C Lawrence Zitnick, *Microsoft coco: Common objects in context*, European conference on computer vision, pages 740-755. Springer, 2014.
[15] Andrew G Howard, Menglong Zhu, Bo Chen, Dmitry Kalenichenko, Weijun Wang, Tobias Weyand, Marco Andreetto, and Hartwig Adam, *Mobilenets: Efficient convolutional neural networks for mobile vision applications*, arXiv preprint arXiv:1704.04861, 2017.
[16] Tsung-Yi Lin, Priya Goyal, Ross Girshick, Kaiming He, and Piotr Dollár, *Focal loss for dense object detection*, Proceedings of the IEEE international conference on computer vision, pages 2980-2988, 2017.

In developing the disclosed embodiments, experiments were performed with various state-of-the-art object detection models including Single Shot object detectors like SSD [1] and Region based detectors like Faster R-CNN [2] and R-FCN [3]. A comparative analysis of the results of the foregoing models was performed, taking into consideration mean Average Precision (mAP), loss and accuracy. While there have been many advances in the domain of object detection, region-based detectors have the advantage of a separate region proposal network and a classification network. This allows manipulation of these networks according to needs. Disclosed herein is an implementation of two region-based detectors namely faster region based Convolutional Neural Network (faster R-CNN) and Region Based Fully Convolutional Network (R-FCN). A comparison of results generated by both embodiments is also provided.

Detection of on-screen controls was performed using HOG [4] and SVM [5] but those approaches were only successful with proper region proposals. The reduced runtime of inferencing using this approach comes at the cost of accuracy. Since the region proposal algorithm is based on finding edges and then joining all the adjacent points having the same color or intensity, it is heavily dependent on the edge detection algorithm [6]. In many cases this algorithm fails to propose proper Regions Of Interest (ROI). There have been many approaches to solve the object detection problem using a variety of architectures, as Deep Neural Networks (DNNs) have shown to outperform traditional feature-based extraction methods.

The performance in object detection has significantly improved with the introduction of Convolutional Neural Networks (CNN). These CNN models have drastically improved the accuracy on image classification tasks as well. Since the introduction of AlexNet [7], many different CNN models have been developed to solve the problem of image classification and object detection. Current state-of-the-art object detectors are divided into 2 types: One stage detectors (Single Shot Detectors) and two stage detectors. The most common detectors are two stage detectors where the first stage is responsible for generating Regions of Interests (ROIs) and the second stage is responsible for the classification and regression task. This architecture was first proposed by Regions with CNN features (R-CNN) [8] which used Selective Search [9] for proposing regions and then classifying these regions using CNN. As a lot of time was consumed in proposing regions using the Selective Search algorithm, this stage was replaced with a Region Proposal Network (RPN) so that it can learn the features of the regions which are to be detected. Faster R-CNN [2] thus performed better and faster than its predecessors as the convolutional layers are shared and the weights of the networks are updated in an alternating fashion.

One stage detectors have been built to detect objects in real-time. Single Shot Detectors (SSD) [1] were introduced to create a scale invariant detector which can use multiple layers of multiple scales to perform classification. Redmon et al. [10] introduced a straightforward method to learn the bounding box coordinates of the object and the class score of the object in a region in one pass over an image.

In developing the disclosed embodiments employed in the system 10, three datasets for three different models were prepared. The models are distinguished based on the features of the controls such as height, width, aspect ratios and scales. The first model, seen in FIG. 7 at 706 consists of the controls that share the feature of width being greater than the height. This includes textboxes, dropdown, pagetabs, buttons and horizontal scrollbars. The second model seen at 707 comprises of checkboxes, radio buttons and image-buttons, sharing the feature of maintaining aspect ratio of 1 (height=width) and the third model 708 consists of table, tree and vertical scrollbars, all of which have the height generally greater than the width. For each model, a training set, validation set and test set were prepared (709, 710, 711). The validation set is preferably prepared by randomly taking some of the images from the dataset, which are then omitted from the training portion. A large number of images were collected for these controls taking into consideration different resolutions, sizes and styles of each control. A considerable number of images were collected from legacy applications like SAP, Powerbuilder and Oracle E-Business Suite, in addition to web forms.

Examples of the various controls classified as 706, 707 or 708 may be seen in the screenshots shown in FIGS. 8A, 8B, 8C and 8D. Reference number 802 shows examples of buttons, reference number 803 shows examples of dropdown boxes, reference number 804 shows examples of textboxes, reference number 805 shows examples of pagetab and reference number 806 shows examples of scrollbars.

The images were then annotated using LabelImg, a graphical image annotation tool and label object bounding boxes in images. Further information regarding LabelImg may be found at Github.com, for example at: https://github.com/tzutalin/labelImg. The annotations were preferably performed in a manner such that features of every control such as border and color are retained. After consideration of all these scenarios, a total of 6764 controls were annotated. The class-wise bifurcation of these annotations is summarized in Table 1 below.

TABLE 1

Number of annotations for each class

| Class | Annotations |
|---|---|
| Button | 1655 |
| Dropdown | 1043 |
| Pagetab | 169 |
| Scrollbars | 436 |

LabelImg stores these annotations in XML files in Pascal-VOC Format. These files store important information about the bounding boxes such as xmin, ymin, xmax, ymax, width, height and class-name. These XML files are then converted to CSV files to carry out the data analysis of all these controls as discussed below and to generate a TensorFlow Record, which is then fed to the network. In addition to the training and validation set, a set of unseen images has been chosen for the test set. The test set is also preferably distributed in such a way that all the features and variations of controls are included. This ensures that the results are a generalized representation and are not biased.

Figure 7:
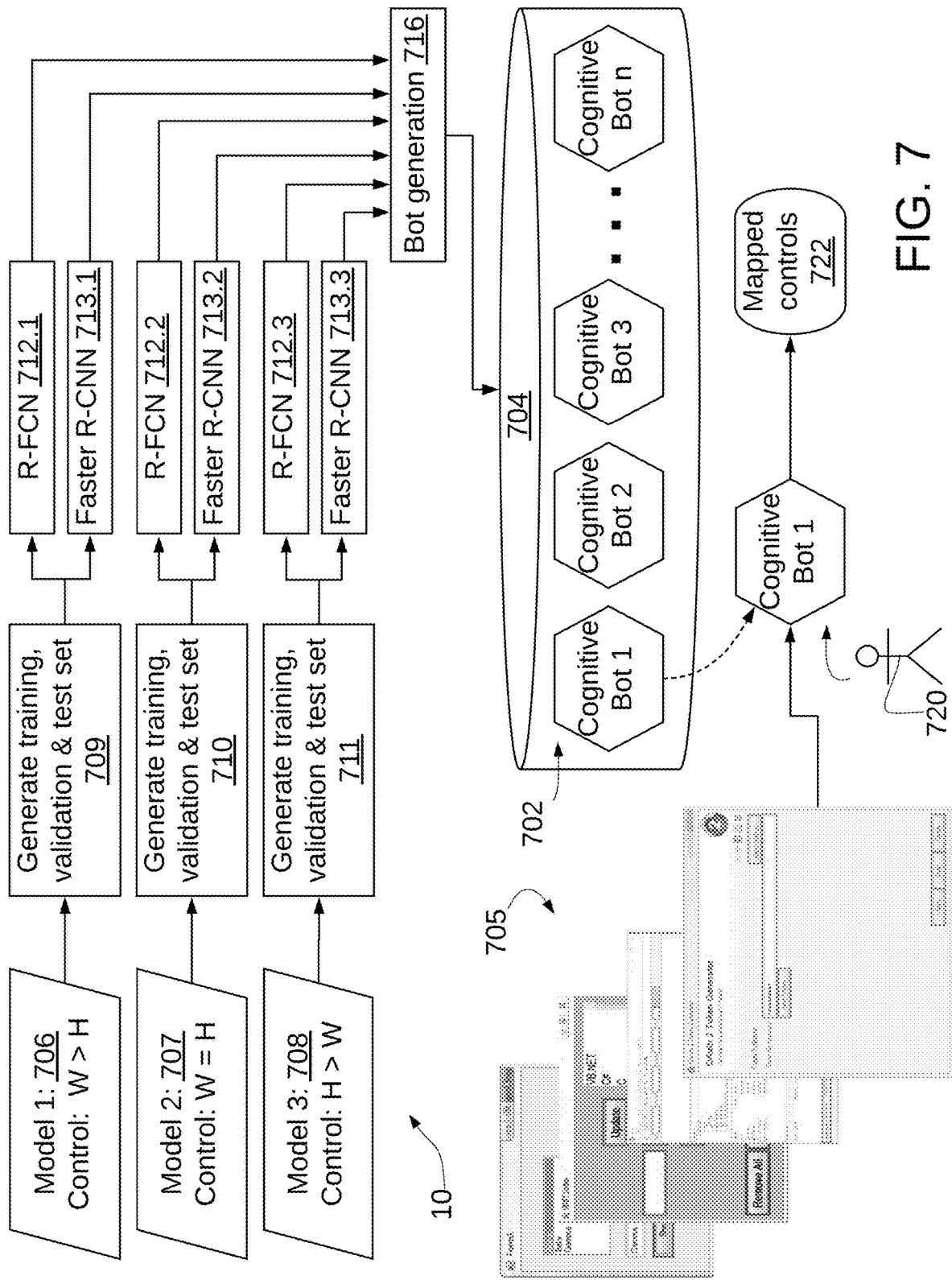
FIG. 7 shows additional aspects of system 10 and in particular a high-level block diagram of automatic detection of controls in application user interfaces.
Figure 8B:
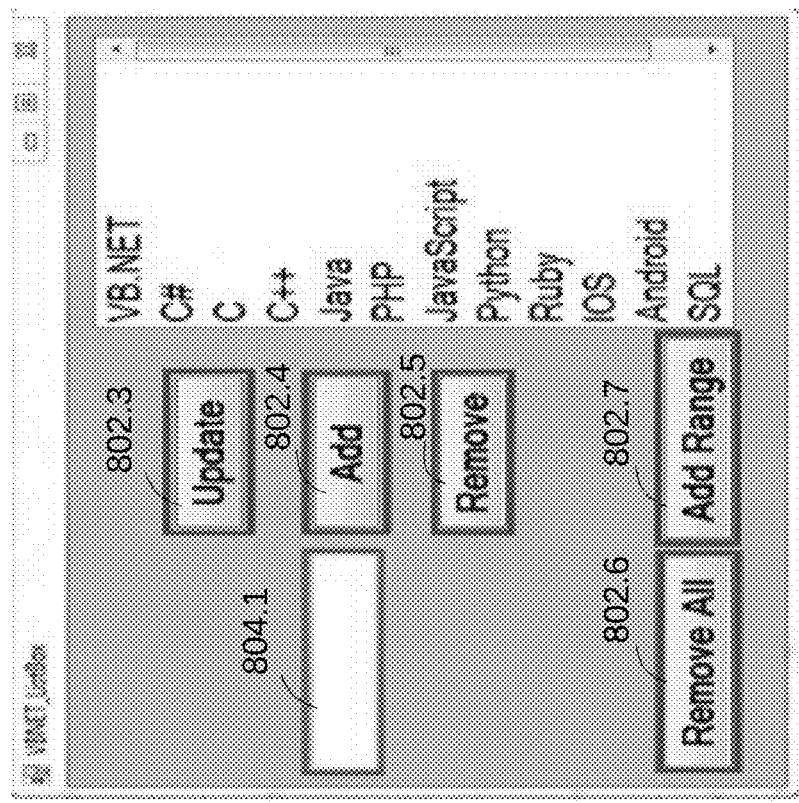
FIGS. 8A, 8B, 8C and 8D are images of various controls employed by various sample application program user interfaces.
Figure 8A:
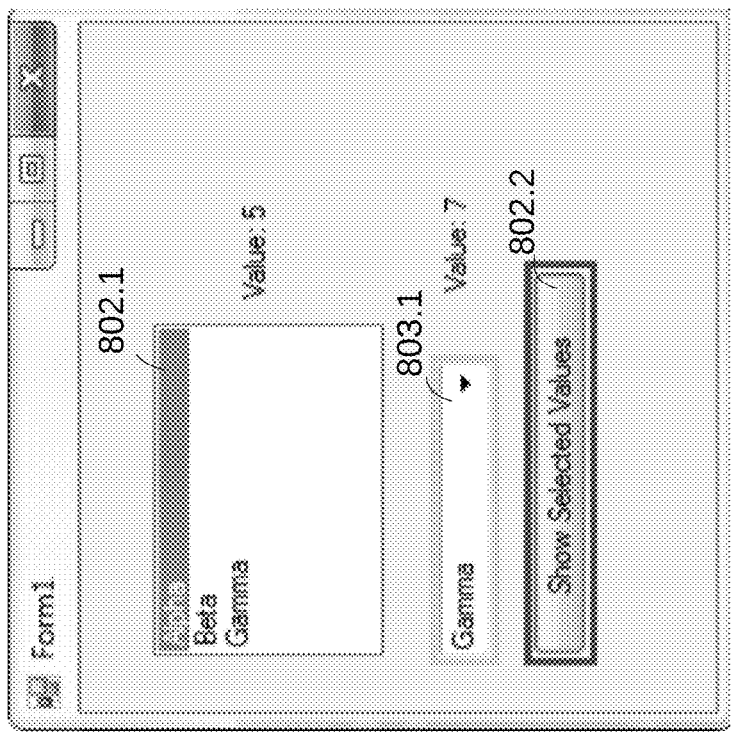
Figure 8D:
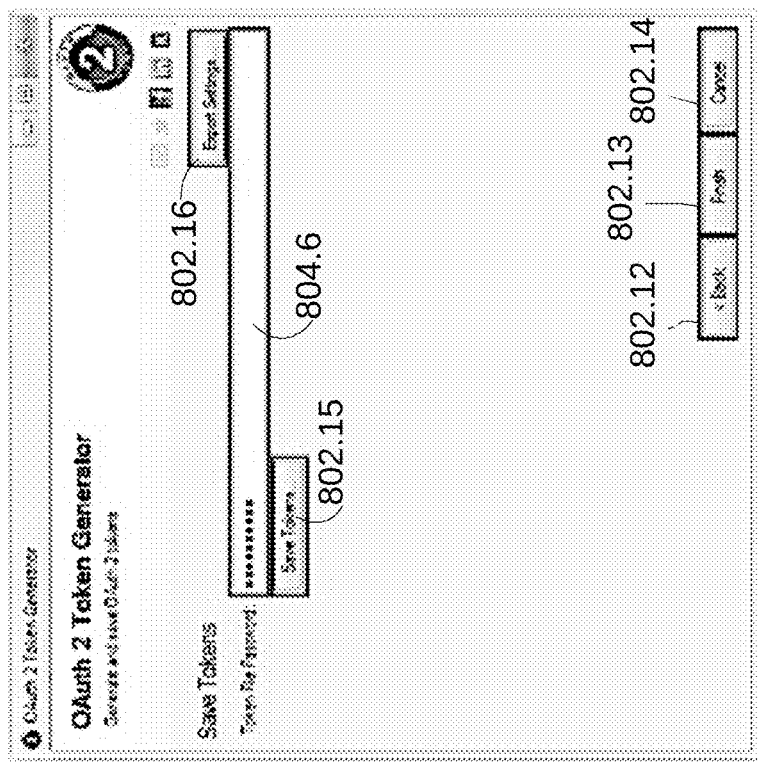
Figure 8C:
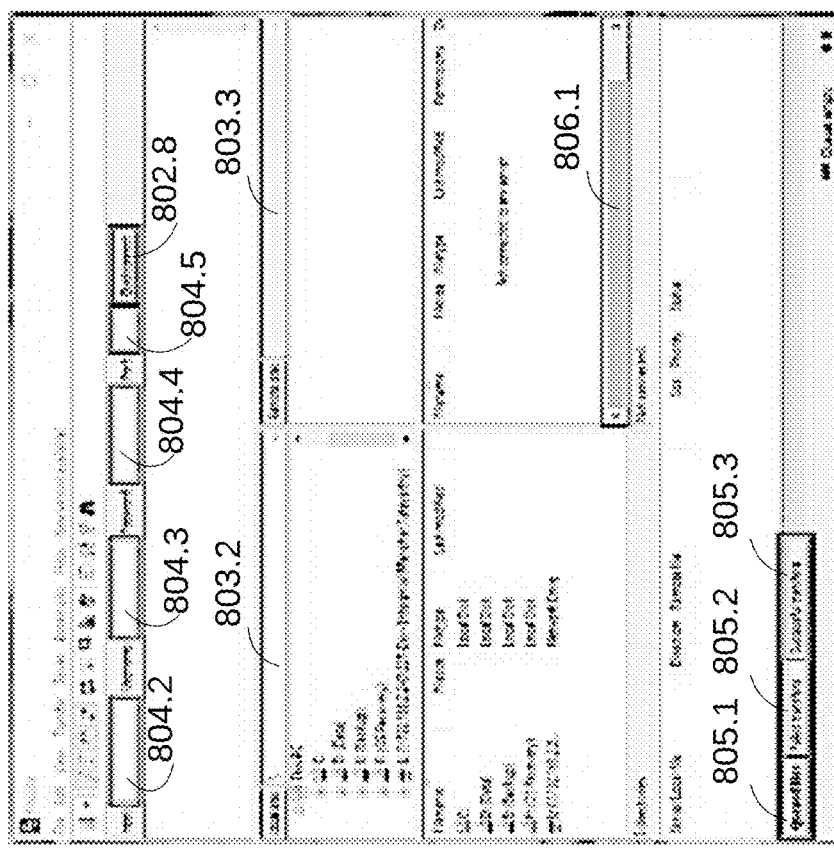

Turning to FIG. 7, an application control detection system in the system 10 employs the three models 706, 707 and 708. Separate training, validation and data sets are generated (709, 710, 711) are generated for each model 706, 707, 708, respectively, as described above. In the embodiment of FIG. 7, two convolutional networks (R-FCN 712 and Faster R-CNN 713) are applied to the data sets 709, 710, 711.

Region based detectors have a separate Region Proposal Network (RPN), that proposes the probable regions that may contain the object and their objectness score, and an object detection network that is responsible for regression of bounding boxes and classification. Since region-based networks have a separate region proposal and classification network, extra time has to be devoted for proposing regions. Hence, its main bottleneck is the time required in region proposals.

Figure 9:
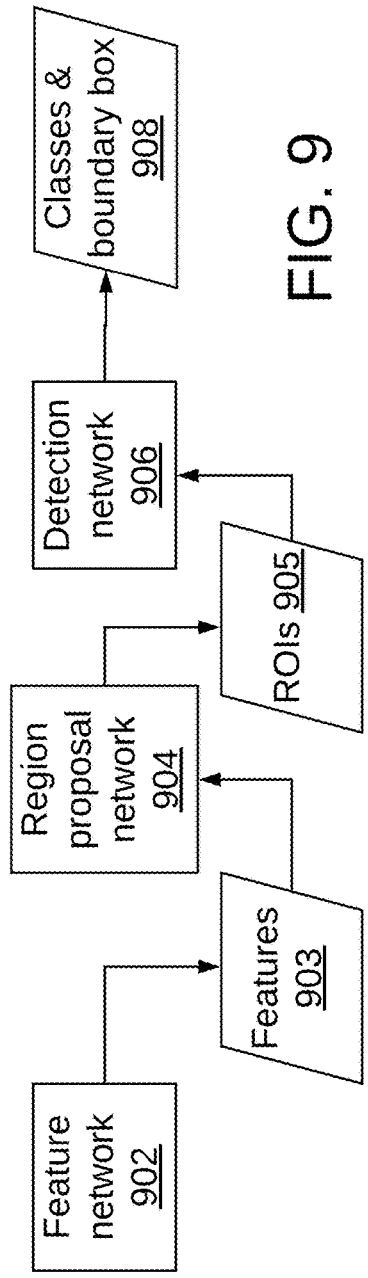
FIGS. 9 and 10 are block diagrams illustrating operation of preferred machine learning models.

R-CNN and Fast R-CNN [11] use selective search to propose regions, which is slow with 2 seconds per proposal on CPU. Hence, the system 10 employs an implementation of Faster R-CNN, an improvement over R-CNN and Fast R-CNN. In contrast to these, faster R-CNN shares the same convolutional layer for region proposal and detection phases. Hence the major computational time required for region proposal in the previous two models is eliminated in faster R-CNN, giving near real time results. Moreover, since selective search is purely based on computer vision and shows no progressive learning with time, it is likely that faster R-CNN which learns to propose regions, given training examples will show better accuracy than its predecessors. Faster R-CNN also shows a unique training pattern. Faster R-CNN employs a Region Proposal Network (RPN) and a detection network that are first trained independently with an Imagenet pretrained model. The training then follows an alternating pattern, where the shared convolutions are fixed and the RPN and detection networks finetune their weights in an alternate fashion. The architecture of faster R-CNN is as shown in FIG. 9. This architecture is divided into three parts: 1) Feature network 902, 2) Region proposal network 904, and 3) Detection network 906. The Feature network 902 is responsible for generating features 903 from the input image. This usually consists of a pretrained classification network. In a preferred implementation, the feature extractor is a pretrained ResNet Network [12]. The reason for using residual networks is to prevent training loss from saturating. The region proposal network 904 employs a base network described in InceptionNet [13] that is pretrained on the MS COCO dataset [14]. This is the network responsible for generating areas of the image that have a high probability of containing object, called "Region of Interests" (ROI) 905. The reason why InceptionNet is used for region proposals is that it allows capture of objects of varying sizes due to its wider network. Hence the size of the control will not affect the region proposals. This network consists of one common layer which serves as input to two other layers, for classification and regression. The image first passes through the first stage of the network, during which the possible ROIs 905 will be generated. The region proposal step is separated from the classification step, which means the loss in generating the ROIs will be backpropagated through the region proposal network 904 only. The region proposal network (RPN) 904 will generate the compressed feature maps as output, which are then passed as input to the second stage. The detection network 906 takes input from both feature network 902 and RPN 904 and is responsible for final classification of identified objects and bounding box regression of the identified objects.

Model Hyper-Parameters. In the Faster R-CNN based implementation, the images have been rescaled to 600× 1024. In one embodiment, the momentum used is 0.9. In this implementation, the initial learning rate is set to 0.0003. The learning rate is reduced to 0.00003 after 900000 steps, which is further reduced to 0.000003 after 1200000 steps. Also, an analysis of the control dimensions was carried out to select appropriate scale and aspect ratios for each model. The mean, median, minimum and maximum height and width for every control was programmatically calculated. A heuristic analysis was again performed on these values, finally resulting in appropriate scales and aspect ratios for each of the three models. Using properly selected values compared to the default values improved the learning rate and accuracy significantly, hence enhancing performance.

Figure 10:
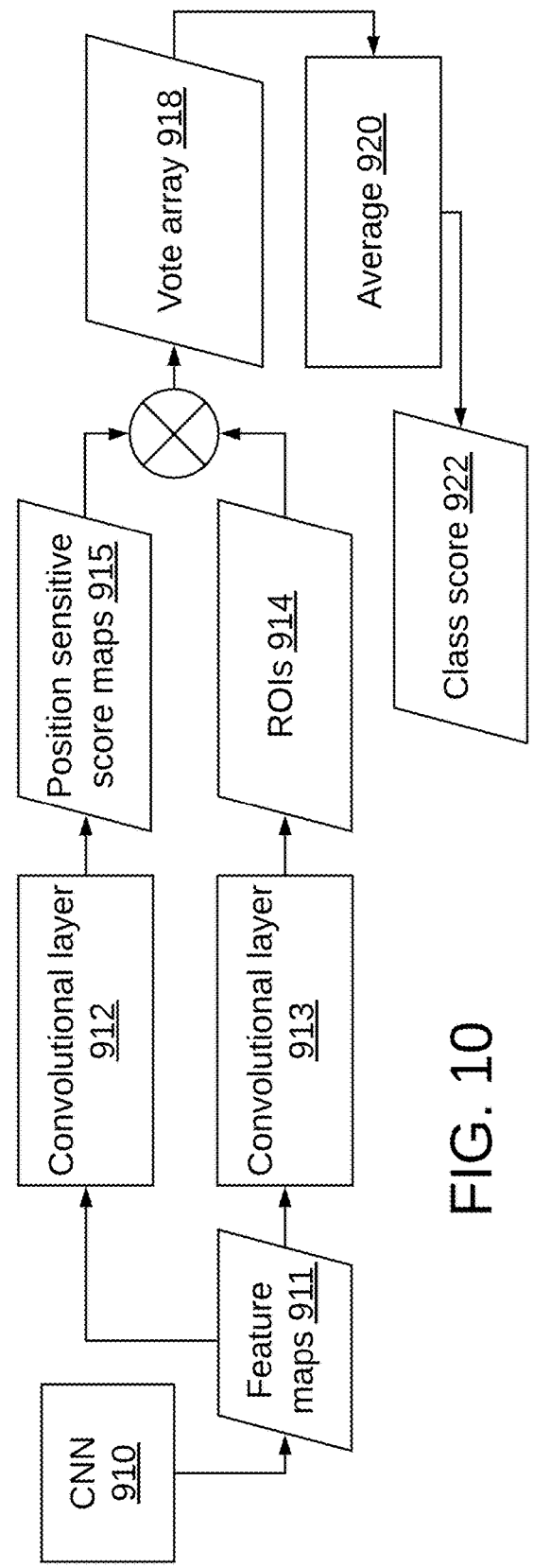

The system 10 also employs a Region Based Fully Convolutional Network (R-FCN) 712 to improve the performance of the pipeline. As R-FCN is a fully convolutional network, it takes less time for inference as compared to Faster R-CNN. Also, R-FCN uses region-based feature maps. These feature maps are independent of ROIs and hence they can be computed outside each ROI. R-FCN calculates the score map of each ROI with the ground truth to determine the objectness and class score. As R-FCN does not have a fully connected (FC) layer after the ROI pooling operation, it performs much faster than Faster R-CNN. By using R-FCN the inference time on a CPU was decreased by 2× as compared to the Faster R-CNN implementation. R-FCN also performed better in terms of accuracy than Faster R-CNN as showed in the graphs. The architecture of R-FCN is shown in FIG. 10. As shown in FIG. 10, the image first passes through a pretrained CNN 910 to generate feature maps 911. These feature maps 911 then pass through two convolutional layers 912 and 913 to generate ROIs 914 and position sensitive score maps 915. Position sensitive score maps 915 are the sub region specific feature maps of the object. The combined results of generated ROIs 914 and position sensitive score maps 915, are mapped into a vote array 918. This mapping is termed as position sensitive ROI pooling. The values of this vote array are averaged at 920 to generate a class score 922. The method employed for bounding box regression is almost the same. Other 4×k×k convolutional filters are generated from the same feature maps (the object is assumed to be divided into k×k subregions). Single shot detectors like SSD were tried but did have not depicted satisfactory performance for the said use case. A comparative analysis of all the approaches is presented in further herein.

Model Hyper-Parameters. All of the hyperparameters of R-FCN based implementation are the same as that of Faster R-CNN based implementation except the method of determining appropriate scales and aspect ratios and introduction of data augmentation, which are discussed in detail below.

Scales and Aspect Ratios. A K-means clustering algorithm is employed to determine proper values of scales and aspect ratios with K=3 since 3 scales and aspect ratios have been used in a default implementation of R-FCN. Using properly selected values compared to the default values improved the learning rate and accuracy significantly, hence enhancing performance.

Data Augmentation. To solve data imbalance among classes, various data augmentation methods were applied, namely random crop, random adjust brightness, random adjust contrast and RGB to grayscale. These augmentation methods solved data imbalance to a certain extent, increasing performance.

Results of the engines 712 and 713 are employed by bot generation engine 716 to generate one or more cognitive software robots (bots), seen generally at 702. The cognitive bots 702 may then be employed by a user 720 to process one or more documents 705 to generate mapped controls 722 where controls in a given application level user interface, such as shown in FIGS. 8A, 8B, 8C, and 8D are identified to enable automated usage by a software robot.

Figures 11A, 11B:
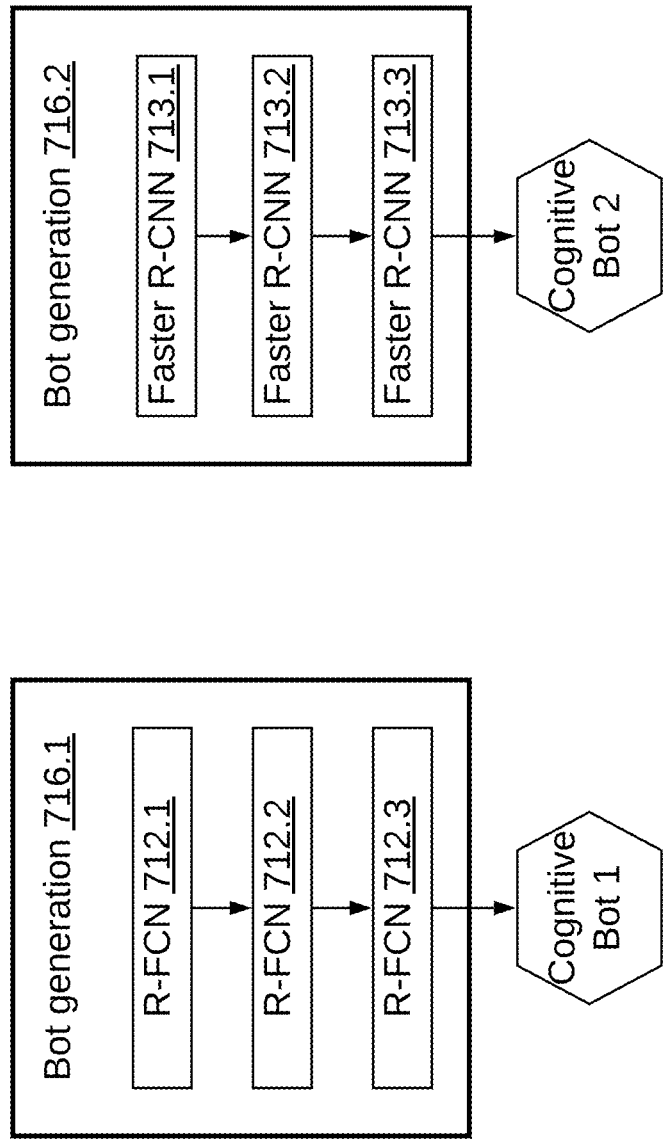
FIGS. 11A, 11B, 11C and 11D are block diagrams illustrating operation of two alternative embodiments of bot generation employed by the system of FIG. 7.
Figure 11C:
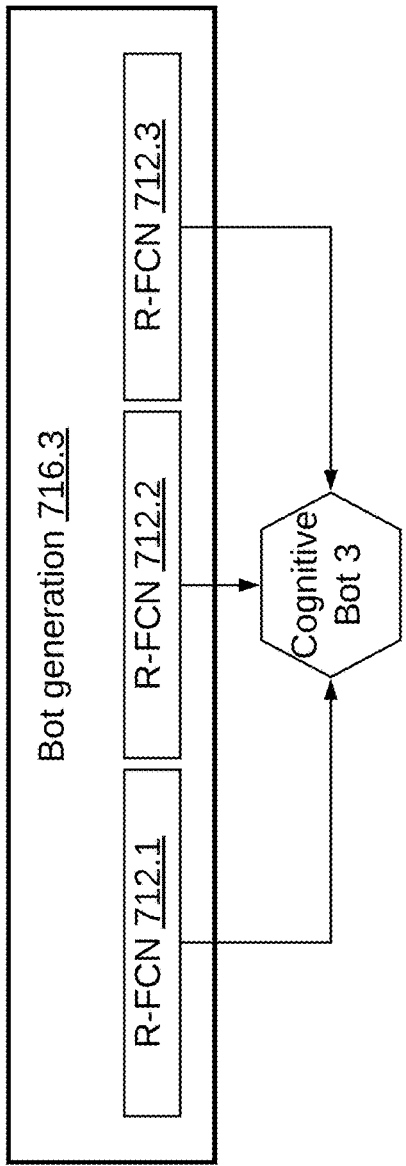
Figure 11D:
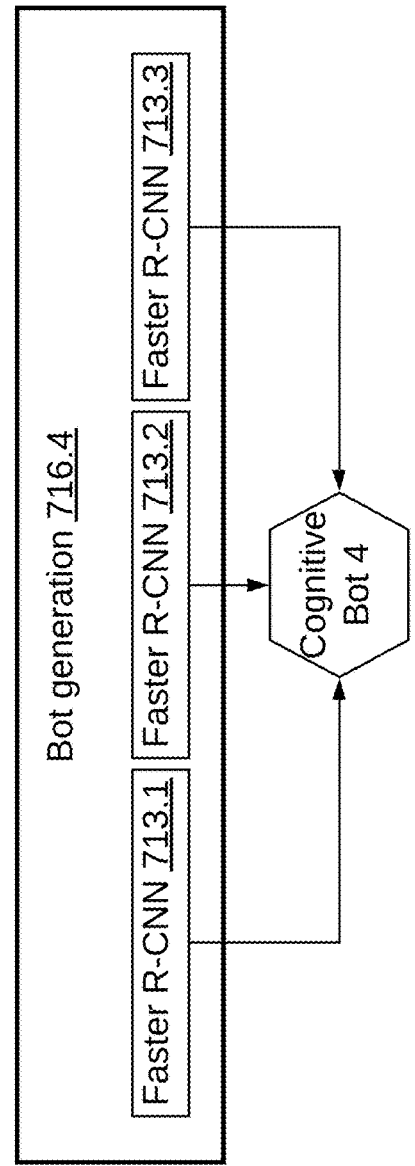

FIGS. 11A, 11B, 11C and 11D are block diagrams illustrating operation of four alternative embodiments of bot generation module 716 employed by the system of FIG. 7. In the embodiment of FIG. 11A, a bot 702 is configured to employ each R-FCN engine 712 to process an image 705. This permits recognition of the various controls for which each of the R-FCN engines (712.1, 712.2, 712.3) is optimized. The order of processing by the engines 712 shown in FIG. 11A is not critical and may be changed. Moreover, the processing need not be sequential but instead may be performed concurrently as seen in FIG. 11C. In the embodiment of FIG. 11B, a bot 702 is configured to employ each Faster R-CNN engine 713 to process an image 705. This permits recognition of the various controls for which each of the Faster R-CNN engines (713.1, 713.2, 713.3) is optimized. The order of processing by the engines 713 shown in FIG. 11B is not critical and may be changed. Moreover, the processing need not be sequential but instead may be performed concurrently as seen in FIG. 11D.

The bots 702 may be employed in a Robotic Process Automation (RPA) system such as available from Automation Anywhere, Inc. Such an RPA system implements a bot creator that may be used by a RPA user, to create one or more bots that are used to automate various business processes executed by one or more computer applications, such as the applications that generate the user interfaces seen in FIGS. 8A, 8B, 8C and 8D. The term "bot" as used herein refers to a set of instructions that cause a computing resource to interact with one or more user level computer applications to perform tasks provided by the one or more user level computer applications. Once created, the bot may be employed to perform the tasks as encoded by the instructions to interact with one or more user level computer applications.

In certain environments, the information provided by an application may contain sensitive information, the distribution or viewing of which may be subject to various regulatory or other restrictions. In such an environment, as described in U.S. patent application "DETECTION AND DEFINITION OF VIRTUAL OBJECTS IN REMOTE SCREENS", Ser. No. 15/957,030, filed on Apr. 19, 2018, which application is hereby incorporated by reference in its entirety, an automation controller, resident on a computer system operates in conjunction with an RPA system to interact with another, remote, computer system. The RPA system sends automation commands and queries to the automation controller, while respecting the security compliance protocols of the remote computer system. As described, a compliance boundary may be implemented in connection with a remote access module. The compliance boundary represents a logical boundary, across which, any transfer of data or other information is controlled by agreements between parties. In certain embodiments, the remote access module may operate to prevent the RPA user from performing certain tasks on the remote system, by way of example and not limitation, copying files, loading cookies, or transmitting data from the remote computer system, through or beyond the compliance boundary via the internet or via any other output device that would violate the security protocols established by the remote computer system. The remote access module may take the form of remote desktop products available from Citrix or Microsoft, which permit connection to a remote computer, to establish a communication link between the user's system and the remote system to permit apps, files, and network resources to be made available. The system 10 described herein may be employed in the above described environment to permit recognition of the application controls provided by the application accessed across the aforementioned compliance boundary.

RESULTS. The results suggest that as the number of instances of the object increase in the dataset, the model performs pretty well for that class. This is evident from FIG. 8 wherein we can see that as the number of instances of horizontal scrollbar is the lowest its average miss rate is the highest at 0.44. Whereas the textbox class has the highest number of annotations and thus its average miss rate is the lowest at 0.05. This can be solved if we increase the dataset to incorporate more instances of minority class.

The models were evaluated against a validation set consisting of 28 images and carried out a comparative analysis of their mean average precision (mAP) for model-1 (textboxes, buttons, dropdowns, pagetabs and horizontal scrollbars). The set consisted of images of various applications previously unseen by the model.

Figure 12:
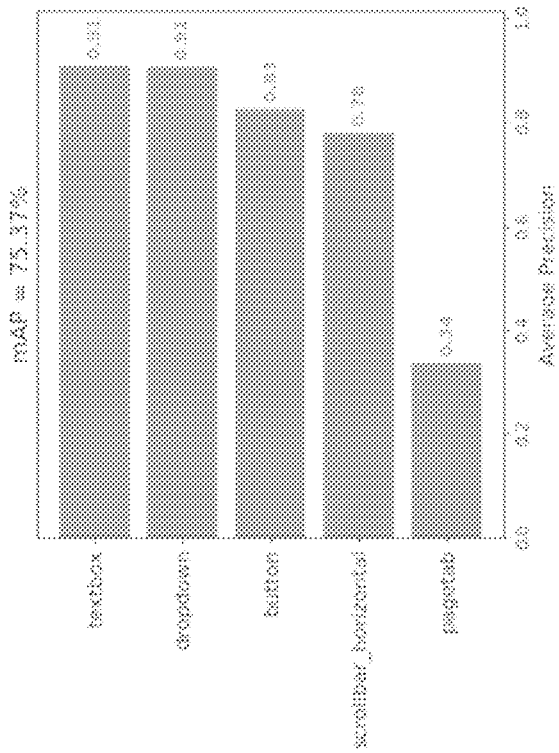
FIG. 12 is a graph comparing performance of two preferred machine learning models (Faster R-CNN and R-CNN).
Figure 13:
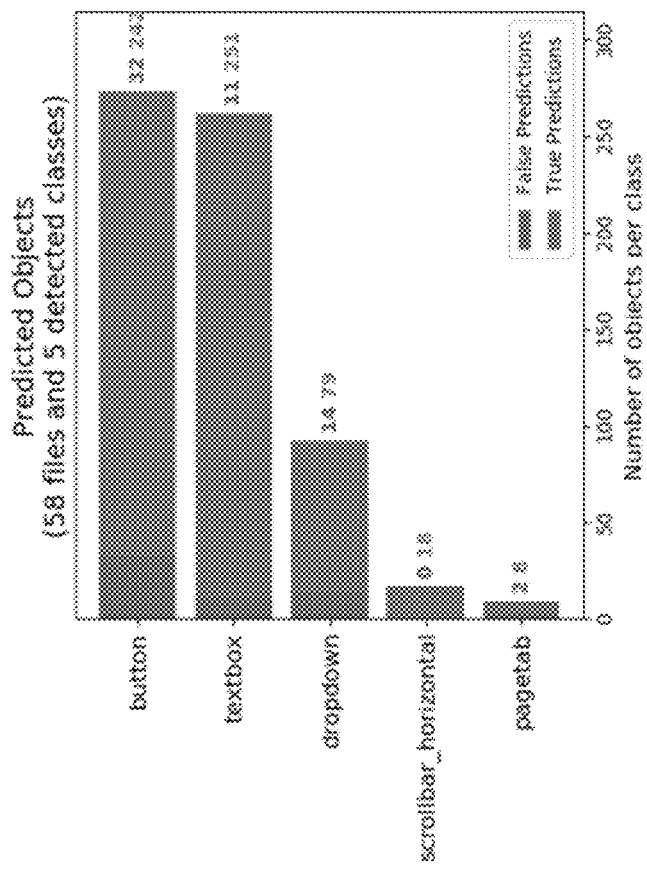
FIG. 13 is a graph showing class-wise performance using Faster R-CNN.
Figure 14:
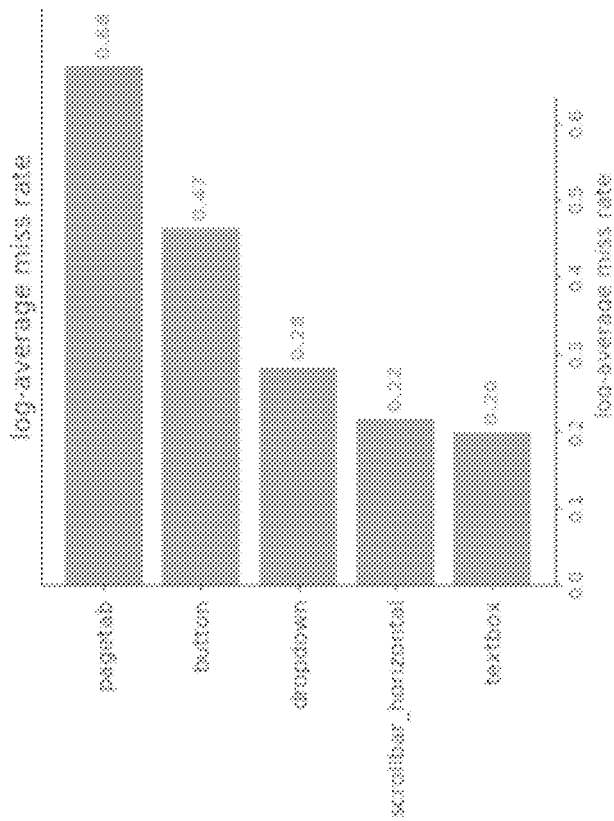
FIG. 14 is a graph showing log-average miss rate for various controls using Faster R-CNN.

Faster R-CNN Results. The Faster R-CNN implementation achieved a mAP of 75.37. The Intersection Over Union (IOU), mAP, classwise predictions and log average miss rate (lamr) are shown in Table 2 below, and FIGS. 11, 12, and 13 respectively.

TABLE 2

Intersection over Union (IoU) for each class using Faster R-CNN

| Class | IoU |
|---|---|
| Button | 0.8426 |
| Dropdown | 0.8274 |
| Pagetab | 0.8095 |
| Scrollbar_horizontal | 0.8556 |
| Textbox | 0.8334 |
| Mean IoU | 0.8368 |

The Precision-Recall (P-R) curve for each of the five classes of model-1 using faster R-CNN are shown in FIGS. 18A, 18B, 18C, 18D, and 18E which are graphs showing P-R curves for various controls using Faster R-CNN, and in FIGS. 19A, 19B, 19C, 19D, and 19E which are graphs showing P-R curves for various controls using R-FCN.

Figure 15:
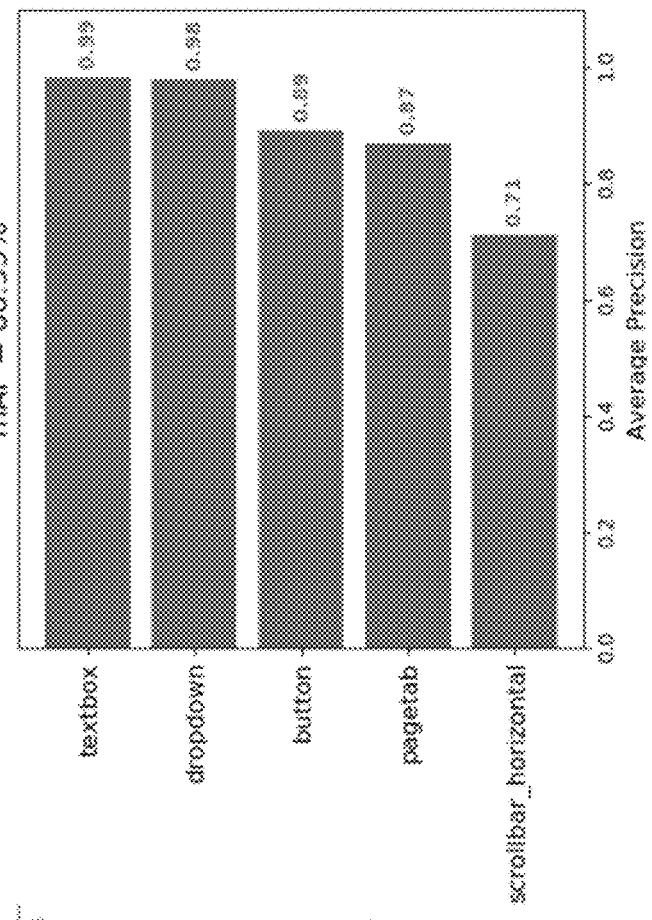
FIG. 15 is a graph showing class-wise mean average precision (mAP) using R-FCN.
Figure 16:
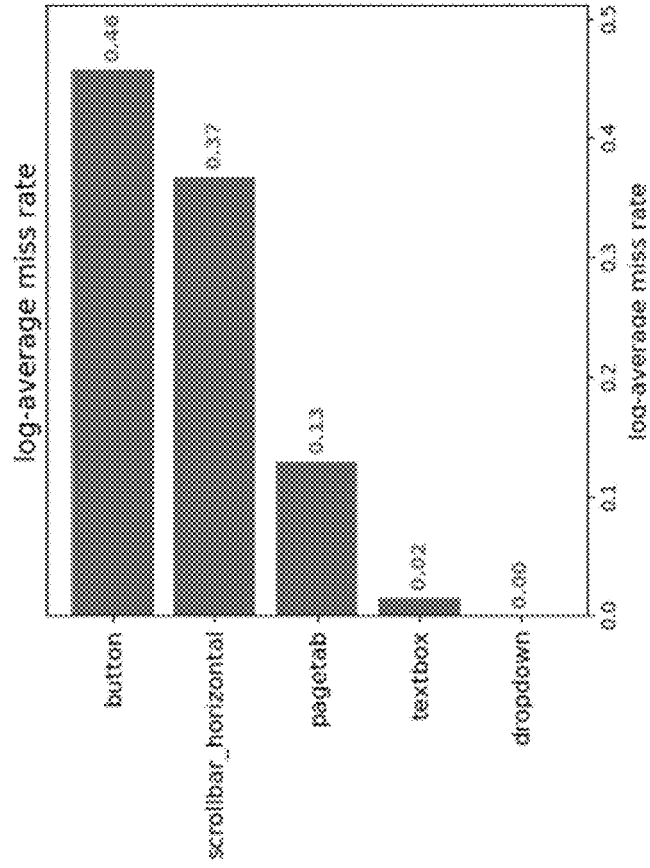
FIG. 16 is a graph showing log average missrate using R-FCN.
Figure 17:
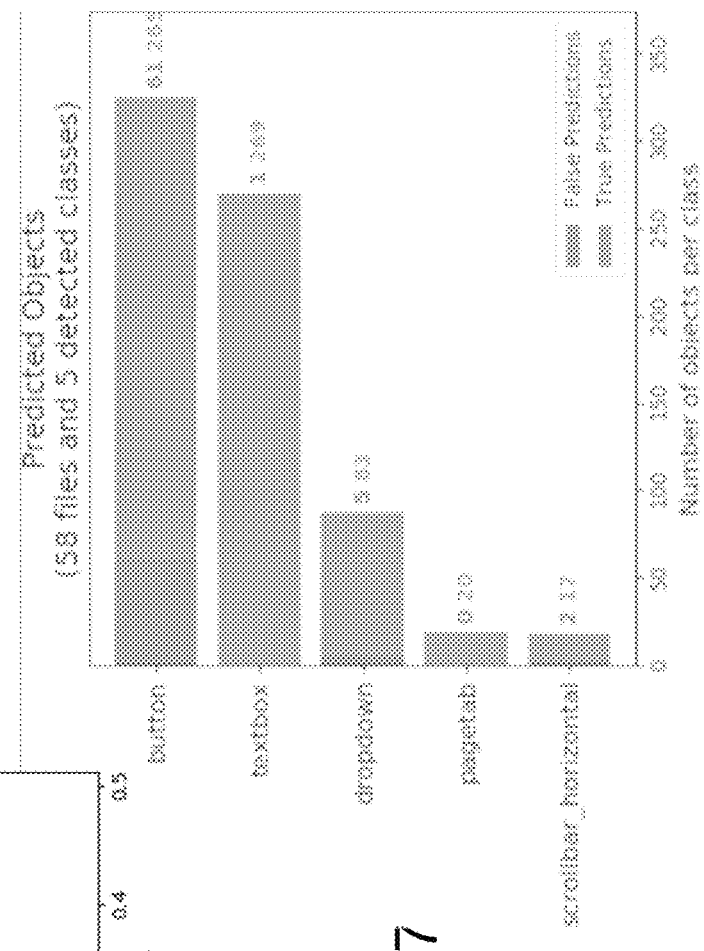
FIG. 17 is a graph showing predicted object information.
Figure 18A:
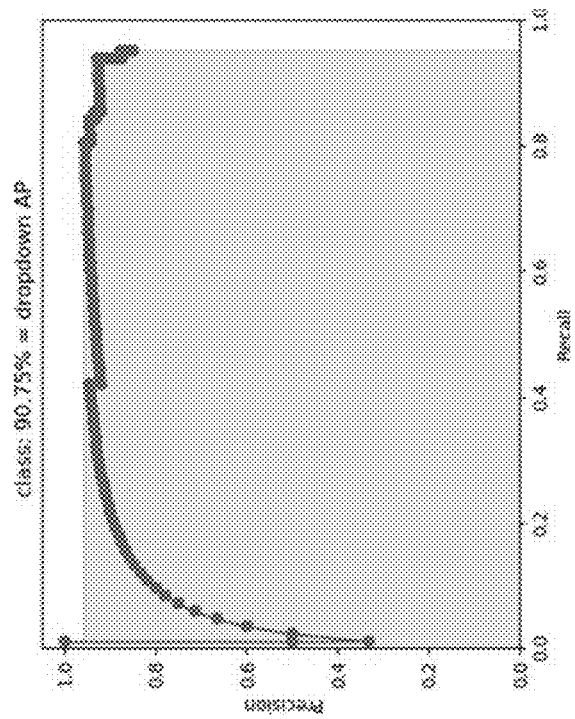
FIGS. 18A, 18B, 18C, 18D, and 18E are graphs showing P-R curves for various controls using Faster R-CNN.
Figure 18B:
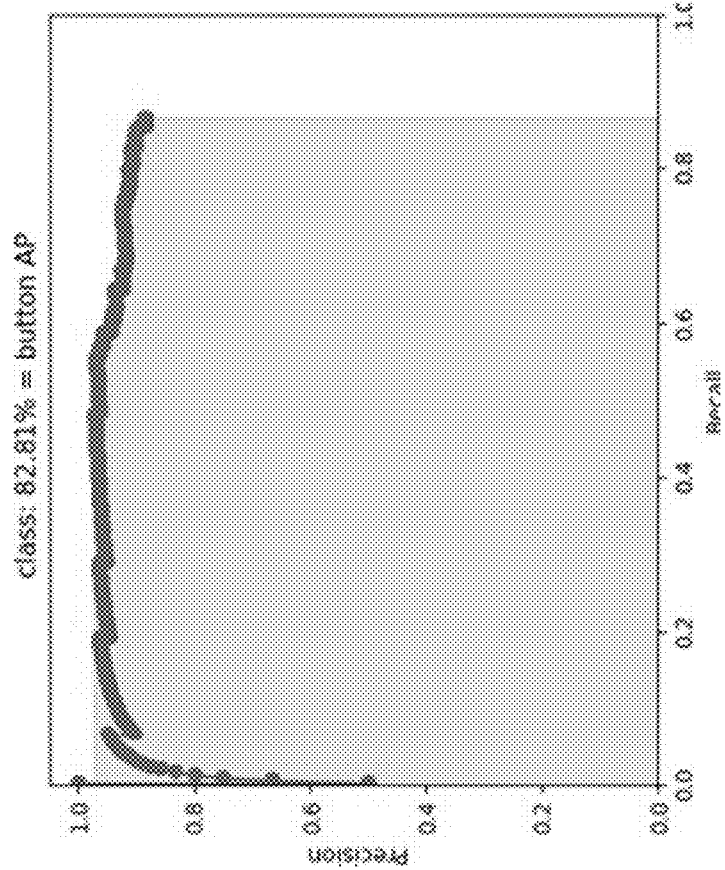
Figure 18C:
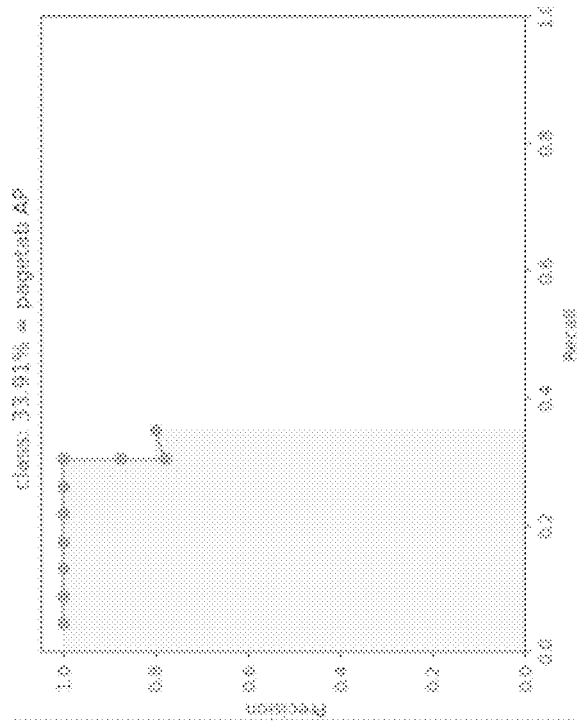
Figure 18D:
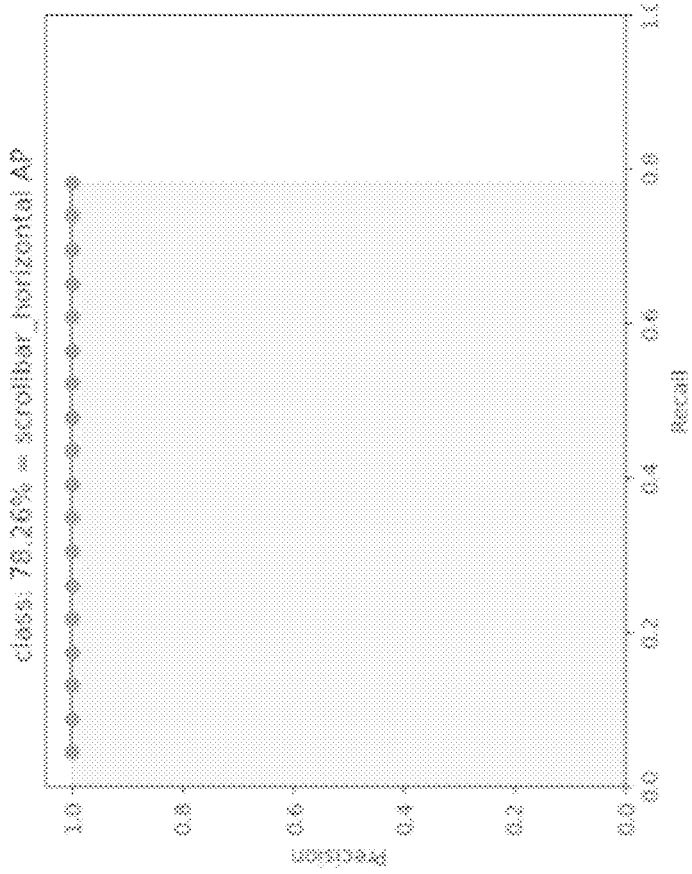
Figure 18E:
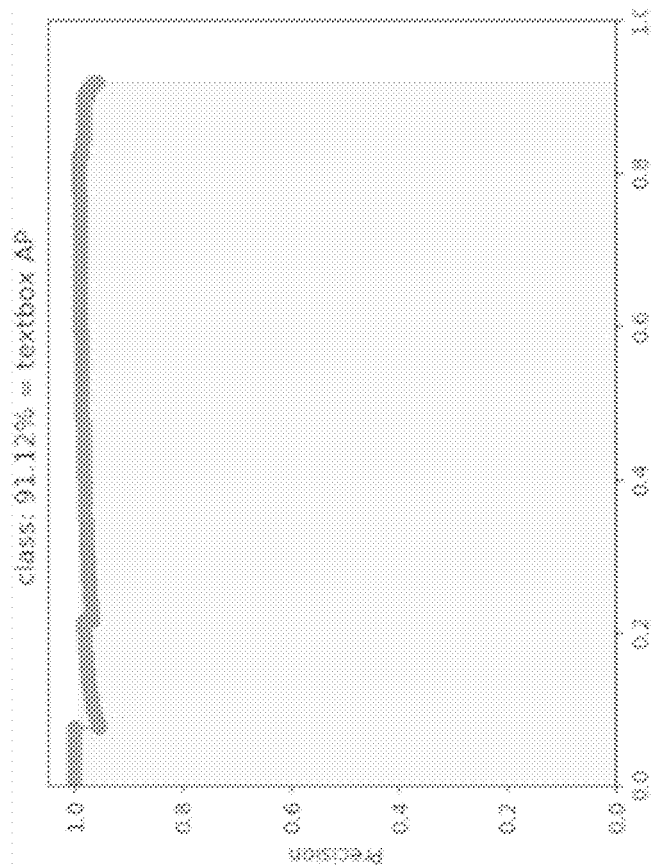
Figure 19A:
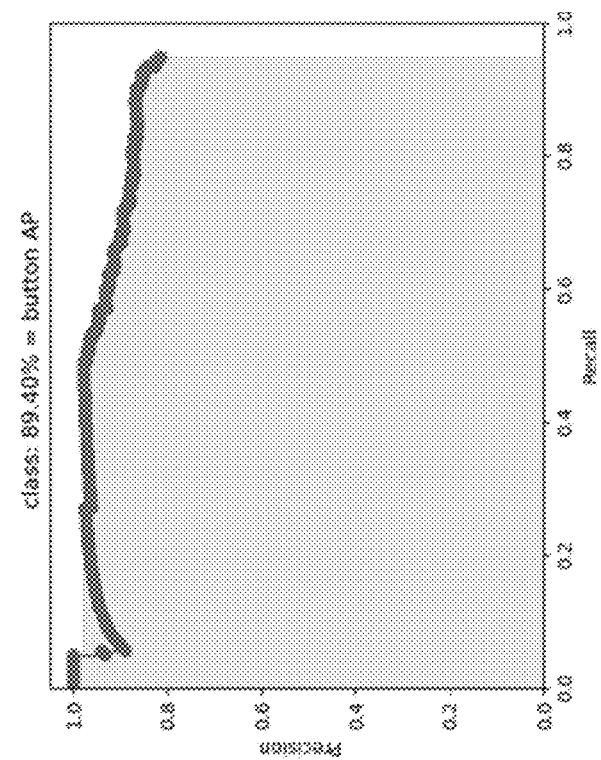
FIGS. 19A, 19B, 19C, 19D, and 19E are graphs showing P-R curves for various controls using R-FCN.
Figure 19B:
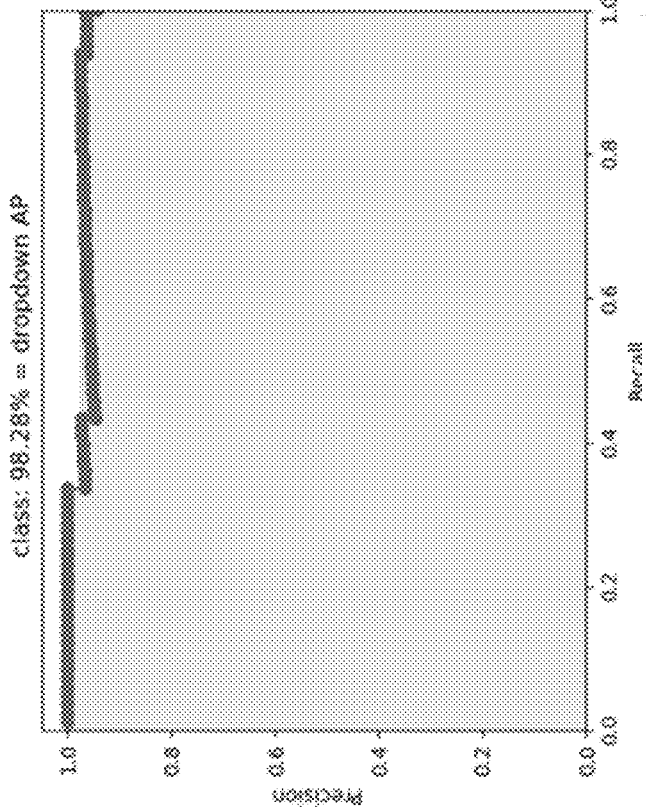
Figure 19C:
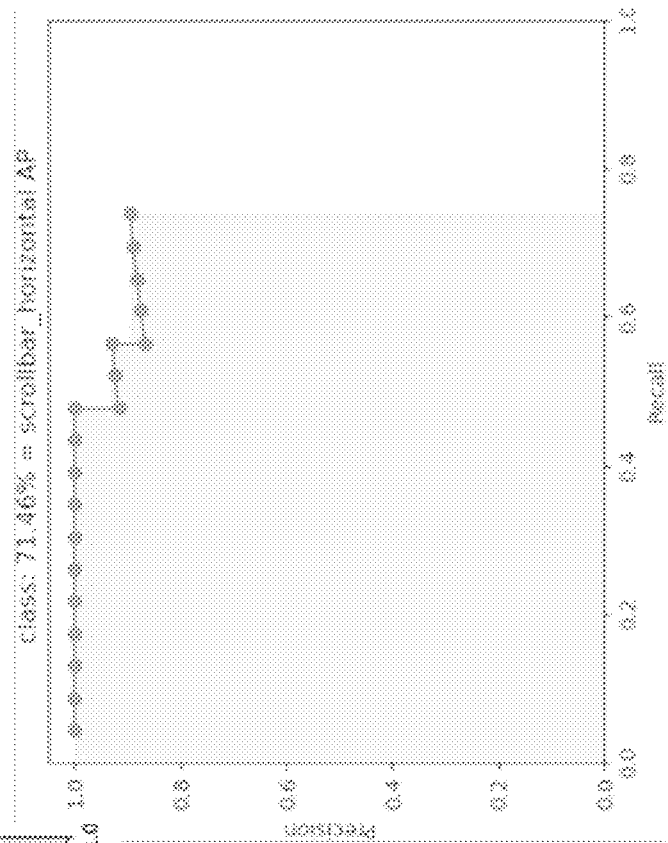
Figure 19D:
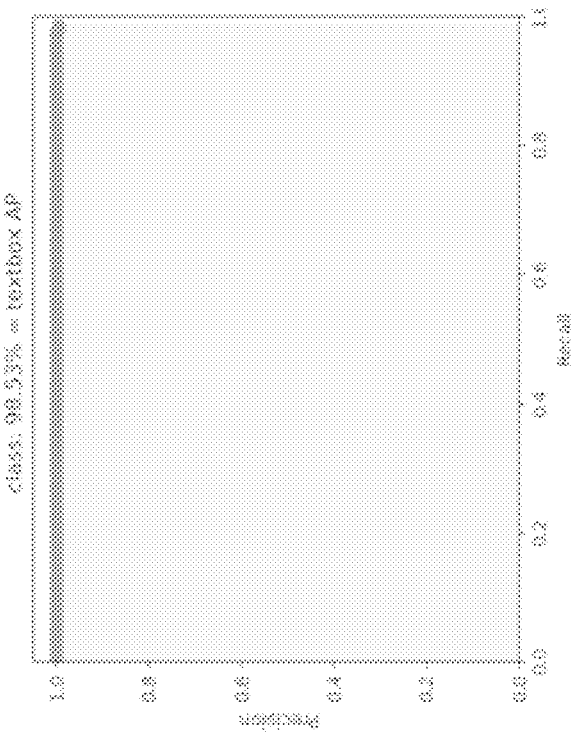
Figure 19E:
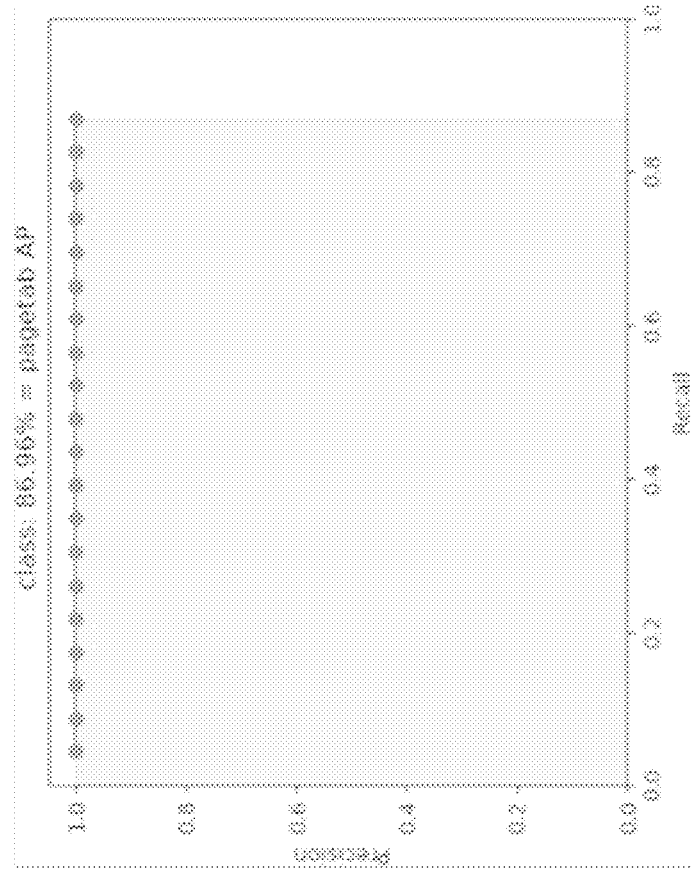

R-FCN Results. The R-FCN implementation achieved mAP of 88.93 using the R-. The Intersection Over Union (IOU), mAP, log average miss rate (lamr), and classwise predictions using R-FCN are shown in Table 3 below, FIG. 15, FIG. 17 and FIG. 17, respectively.

TABLE 3

Intersection over Union (IoU) for each class using Faster R-FCN

| Class | IoU |
|---|---|
| Button | 0.8941 |
| Dropdown | 0.8821 |

TABLE 3-continued

Intersection over Union (IoU) for each
class using Faster R-FCN

| Class | IoU |
| --- | --- |
| Pagetab | 0.8213 |
| Scrollbar_horizontal | 0.8384 |
| Textbox | 0.8814 |
| Mean IoU | 0.8834 |

The Precision-Recall (P-R) curve for each of the five classes of model-1 using R-FCN are shown in FIGS. 19A, 19B, 19C, 19D and 19E.

The current network is significantly heavy and takes about 1-2 days for training on our dataset. In an alternative embodiment, a shallow network that retains the present accuracy and is computationally inexpensive compared to R-FCN may be employed. Also, training on different models such as SSD ResNet, MobileNet [15] or RetinaNet [16] can be employed. Additional embodiments may be specifically focused on additional controls like sliders, image buttons, tables, and toggle buttons. Moreover, since the dataset is a critical factor influencing the performance, the addition of more data will lead to enhanced performance.

Figure 20:
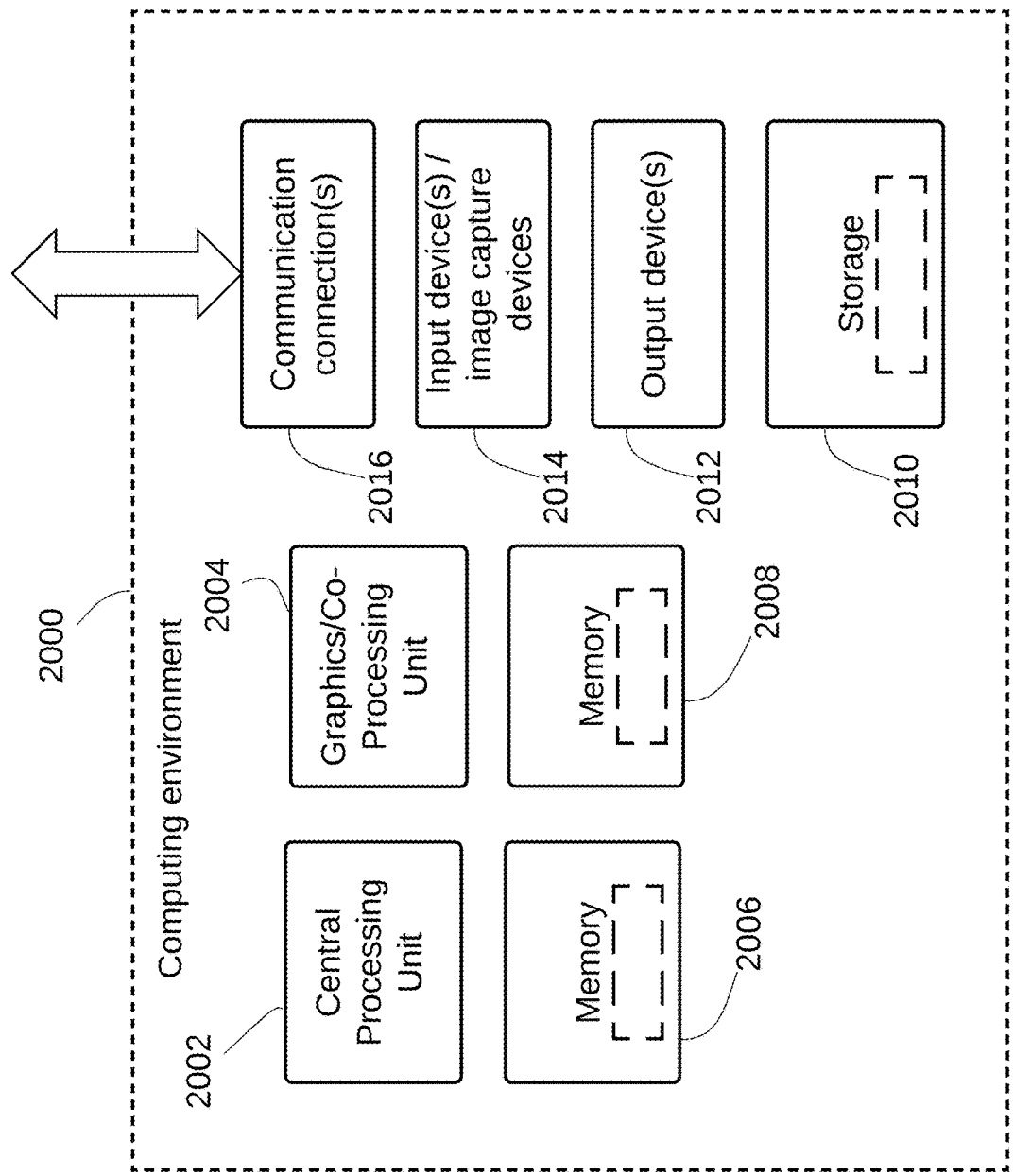
FIG. 20 illustrates a block diagram of hardware that may be employed in an implementation of the systems disclosed herein.

FIG. 20 illustrates a block diagram of hardware that may be employed in an implementation of the RPA system as disclosed herein. FIG. 20 depicts a generalized example of a suitable general-purpose computing system 2000 in which the described innovations may be implemented in order to improve the processing speed and efficiency with which the computing system 2000 operates to perform the functions disclosed herein. With reference to FIG. 20 the computing system 2000 includes one or more processing units 2002, 2004 and memory 2006, 2008. The processing units 2002, 2006 execute computer-executable instructions. A processing unit can be a general-purpose central processing unit (CPU), processor in an application-specific integrated circuit (ASIC) or any other type of processor. The tangible memory 2006, 2008 may be volatile memory (e.g., registers, cache, RAM), non-volatile memory (e.g., ROM, EEPROM, flash memory, etc.), or some combination of the two, accessible by the processing unit(s). The hardware components in FIG. 20 may be standard hardware components, or alternatively, some embodiments may employ specialized hardware components to further increase the operating efficiency and speed with which the system 100 operates. The various components of computing system 2000 may be rearranged in various embodiments, and some embodiments may not require nor include all of the above components, while other embodiments may include additional components, such as specialized processors and additional memory.

Computing system 2000 may have additional features such as for example, storage 2010, one or more input devices 2014, one or more output devices 2012, and one or more communication connections 2016. An interconnection mechanism (not shown) such as a bus, controller, or network interconnects the components of the computing system 2000. Typically, operating system software (not shown) provides an operating system for other software executing in the computing system 2000, and coordinates activities of the components of the computing system 2000.

The tangible storage 2010 may be removable or non-removable, and includes magnetic disks, magnetic tapes or cassettes, CD-ROMs, DVDs, or any other medium which can be used to store information in a non-transitory way, and which can be accessed within the computing system 2000. The storage 2010 stores instructions for the software implementing one or more innovations described herein.

The input device(s) 2014 may be a touch input device such as a keyboard, mouse, pen, or trackball, a voice input device, a scanning device, or another device that provides input to the computing system 2000. For video encoding, the input device(s) 2014 may be a camera, video card, TV tuner card, or similar device that accepts video input in analog or digital form, or a CD-ROM or CD-RW that reads video samples into the computing system 2000. The output device (s) 2012 may be a display, printer, speaker, CD-writer, or another device that provides output from the computing system 2000.

The communication connection(s) 2016 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for automated detection of application level controls and text in an image displayed by a computer application, comprising:

retrieving a first dataset comprising images containing a first type of application control, wherein each first type of application control of a plurality of first type of application controls in each image in the first dataset is characterized by dimensions where width of the first type of application control is greater than height of the first type of application control;

retrieving a second dataset comprising images containing a second type of application control, wherein each second type of application control of a plurality of second type of application controls in each image in the second dataset is characterized by dimensions where width of the second type of application control is substantially equal to height of the second type of application control;

retrieving a third dataset comprising images containing a third type of application control, wherein each third type of application control of a plurality of third type of application controls in each image in the third dataset is characterized by dimensions where height of the third type of application control is greater than width of the third type of application control application;

processing each of the first, second and third datasets with a region-based engine to generate a first trained region-based engine that is trained to recognize application controls characterized by dimensions where width is greater than height, second trained region-based engine that is trained to recognize application controls characterized by dimensions where width is substantially equal to height, third trained region-based engine that is trained to recognize application controls characterized by dimensions where height is greater than width, and combining the first, second and third trained region-based engines to generate a software robot configured to recognize, from an input image generated from a screen of an application program, application controls wherein the application controls are characterized by dimensions where width is greater than height, where width is substantially equal to height, and where height is greater than width;

further configuring the software robot to recognize, from an input generated from a screen of the application program, text on the screen of the application program by employing a computerized deep learning system that has been trained with training data generated by generating a plurality of synthetic text segments, by programmatically converting each of a plurality of text strings to a corresponding image, each text string and corresponding image forming a synthetic image/text tuple;

generating a plurality of real-life text segments by processing from a corpus of document images, at least a subset of images from the corpus, with a plurality of OCR programs, each of the OCR programs processing each image from the subset to produce a real-life image/text tuple, and at least some of the OCR programs producing a confidence value corresponding to each real-life image/text tuple, and wherein each OCR program is characterized by a conversion accuracy substantially below a desired accuracy for an identified domain; and storing the synthetic image/text tuple and the real-life image/text tuple to data storage as training data in a format accessible by the computerized deep learning system for training.

2. The computerized method of claim 1 further comprising:

augmenting the synthetic image/text tuples and the real-life image/text tuples data by adding noise to image portions of the tuples.

3. The computerized method of claim 2 further wherein adding noise to image portions of the tuples comprises:

randomly selecting image portions of the tuples and superimposing to the selected image portions, noise selected from the group consisting of random speckled noise, random lines, random binarization threshold, white on black text.

4. The computerized method of claim 2 wherein adding noise to image portions of the tuples comprises:

randomly selecting image portions of the tuples and superimposing patterned noise to the selected image portions.

5. The computerized method of claim 2 further comprising processing the image portions of the tuples to format the image portions into a fixed normative input employed by the computerized deep learning system.

6. The computerized method of claim 5 wherein processing the image portions of the tuples to format the image portions into a fixed normative input employed by the computerized deep learning system comprises:

scaling the image portion of each of the tuples to fit in a field of view of the computerized deep learning system.

7. The computerized method of claim 5 wherein processing the image portions of the tuples to format the image portions into a fixed normative input employed by the computerized deep learning system comprises:

centering the image portion of each of the tuples within a field of view of the computerized deep learning system.

8. The computerized method of claim 1 further comprising:

processing, for storage as training data, output of the OCR programs by employing statistical metrics to identify the highest quality tuples generated by the OCR programs.

9. A robotic process automation system comprising:

data storage for storing a plurality of images of application user interfaces, wherein each application user interface of the application user interfaces comprises one or more application controls usable by a human user to interact with an application that generates the application user interface;

a server processor operatively coupled to the data storage and configured to execute instructions that when executed cause the server processor to recognize one or more of the application controls, by:

retrieving a first dataset comprising images containing a first type of application control, wherein each first type of application control of a plurality of first type of application controls in each image in the first dataset is characterized by dimensions where width of the first type of application control is greater than height of the first type of application control;

retrieving a second dataset comprising images containing a second type of application control, wherein each second type of application control of a plurality of second type of application controls in each image in the second dataset is characterized by dimensions where width of the second type of application control is substantially equal to height of the second type of application control;

retrieving a third dataset comprising images containing a third type of application control, wherein each third type of application control of a plurality of third type of application controls in each image in the third dataset is characterized by dimensions where height of the third type of application control is greater than width of the third type of application control application;

processing each of the first, second and third datasets with a convolutional network to generate for each of the datasets, a trained convolutional engine, wherein each trained convolutional engine is trained to recognize a particular type of application control;

recognizing text on the application user interface by employing a computerized deep learning system that has been trained with training data generated by generating a plurality of synthetic text segments, by programmatically converting each of a plurality of text strings to a corresponding image, each text string and corresponding image forming a synthetic image/text tuple;

generating a plurality of real-life text segments by processing from a corpus of document images, at least a subset of images from the corpus, with a plurality of OCR programs, each of the OCR programs processing each image from the subset to produce a real-life image/text tuple, and at least some of the OCR programs producing a confidence value corresponding to each real-life image/text tuple, and wherein each OCR program is characterized by a conversion accuracy substantially below a desired accuracy for an identified domain; and storing the synthetic image/text tuple and the real-life image/text tuple to data storage as training data in a format accessible by the computerized deep learning system for training; and combining the trained convolutional engines to generate a first software robot trained with the training data and configured to recognize, from an input image, application controls and associated text wherein the application controls are characterized by dimensions corresponding to characteristics of one of the convolutional engines.

10. The robotic process automation system of claim 9 wherein each of the convolutional networks comprises a region-based faster R-CNN engine each of which comprises:
   a feature network that generates features from the input image,
   a region proposal network that generates from the features, regions of interest, wherein the regions of interest comprise areas of the input image that have a high probability of containing an object, and
   a detection network that generates from the regions of interest, classifications of identified objects and bounding box regressions of the identified objects.

11. The robotic process automation system of claim 9 wherein combining the trained convolutional engines to generate a first software robot comprises:
   combining the first, second and third convolutional engines to cause sequential processing by the trained convolutional engines.

12. The robotic process automation system of claim 9 wherein combining the trained convolutional engines to generate a first software robot comprises:
   combining the first, second and third convolutional engines to cause concurrent processing by the trained convolutional engines.

13. The computerized method of claim 9 wherein each of the convolutional engines comprises:
   a pretrained convolutional neural network that generates from an input image
   a plurality of feature maps,
   a second and a third convolutional neural network that each receive the plurality of feature maps, wherein the second convolutional neural network generates regions of interest from the feature maps and wherein the third convolutional neural network generates a plurality of position sensitive score maps,
   combining the regions of interest and the position sensitive score maps to generate a vote array that comprises a position sensitive regions of interest pooling, and
   averaging values of the vote array to generate a class score.

14. The robotic process automation system of claim 9 wherein the server processor is further configured to execute instructions that when executed cause the server processor to recognize one or more of the application controls, by:
   processing each of the first, second and third datasets with a region-based faster R-CNN engine to generate a first trained region-based faster R-CNN engine that is trained to recognize application controls characterized by dimensions where width is greater than height,
   second trained region-based faster R-CNN engine that is trained to recognize application controls characterized by dimensions where width is substantially equal to height,
   third trained region-based faster R-CNN engine that is trained to recognize application controls characterized by dimensions where height is greater than width, and
   combining the first, second and third trained region-based faster R-CNN engines to generate a second software robot configured to recognize, from an input image, application controls characterized by dimensions where width is greater than height, where width is substantially equal to height, and where height is greater than width.

15. The robotic process automation system of claim 14 wherein combining the first, second and third trained region-based faster R-CNN engines to generate a software robot configured to recognize application controls characterized by dimensions where width is greater than height, where width is substantially equal to height, and where height is greater than width comprises:
   combining the first, second and third trained region-based faster R-CNN engines to cause sequential processing by the first, second and third trained region-based faster R-CNN engines.

16. The robotic process automation system of claim 14 wherein combining the first, second and third trained region-based faster R-CNN engines to generate a software robot configured to recognize application controls characterized by dimensions where width is greater than height, where width is substantially equal to height, and where height is greater than width comprises:
   combining the first, second and third trained region-based faster R-CNN engines to cause concurrent processing by the first, second and third trained region-based faster R-CNN engines.

17. The robotic process automation system of claim 9 further comprising:
   augmenting the synthetic image/text tuples and the real-life image/text tuples data by adding noise to image portions of the tuples.

18. The robotic process automation system of claim 17 wherein adding noise to image portions of the tuples comprises:
   randomly selecting image portions of the tuples and superimposing to the selected image portions, noise selected from the group consisting of random speckled noise, random lines, random binarization threshold, white on black text.

19. The robotic process automation system of claim 17 wherein adding noise to image portions of the tuples comprises:
   randomly selecting image portions of the tuples and superimposing patterned noise to the selected image portions.

20. The robotic process automation system of claim 17 further comprising processing the image portions of the tuples to format the image portions into a fixed normative input employed by the computerized deep learning system.

* * * * *